United States Patent
Lohe et al.

(10) Patent No.: US 12,088,077 B1
(45) Date of Patent: Sep. 10, 2024

(54) SYSTEMS AND METHODS FOR LAMINATED BUSWORK WITH FLEXIBLE CONDUCTORS FOR AN ELECTRIC AIRCRAFT

(71) Applicant: BETA AIR, LLC, South Burlington, VT (US)

(72) Inventors: Braedon Lohe, Essex Junction, VT (US); Nathan William Joseph Wiegman, Essex Junction, VT (US); Sean Donovan, Richmond, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/564,361

(22) Filed: Dec. 29, 2021

(51) Int. Cl.
*H02G 5/00* (2006.01)
*B64D 27/24* (2006.01)
*H01H 1/58* (2006.01)

(52) U.S. Cl.
CPC .............. *H02G 5/005* (2013.01); *B64D 27/24* (2013.01); *H01H 1/5822* (2013.01); *B64D 2221/00* (2013.01)

(58) Field of Classification Search
None
See application file for complete search history.

(56) References Cited

U.S. PATENT DOCUMENTS

| | | | |
|---|---|---|---|
| 5,866,848 A | 2/1999 | Asselta et al. | |
| 6,325,640 B1 | 12/2001 | Kasai | |
| 6,420,655 B1 | 7/2002 | Yang et al. | |
| 7,557,298 B2 | 7/2009 | Vanhoutte et al. | |
| 8,859,897 B2 | 10/2014 | Hadi et al. | |
| 8,922,978 B2 | 12/2014 | Brett | |
| 9,270,091 B2 | 2/2016 | Erdle et al. | |
| 9,929,391 B2 | 3/2018 | Nakamura et al. | |
| 10,637,112 B2 | 4/2020 | Shin et al. | |
| 11,056,753 B2 | 7/2021 | Takamatsu et al. | |
| 11,088,422 B2 | 8/2021 | Oga et al. | |
| 11,121,557 B2 | 9/2021 | Cottrell et al. | |
| 2003/0091896 A1 | 5/2003 | Watanabe et al. | |
| 2020/0243830 A1 | 7/2020 | Tanaka et al. | |

(Continued)

FOREIGN PATENT DOCUMENTS

EP 3792996 A1 3/2021

OTHER PUBLICATIONS

Mersen, Solutions for Power Management Laminated Bus Bar Solutions, Sep. 30, 2020.

(Continued)

*Primary Examiner* — Jared Fureman
*Assistant Examiner* — Aqeel H Bukhari
(74) *Attorney, Agent, or Firm* — Hoffman Warnick LLC

(57) ABSTRACT

A system for a laminated buswork with flexible conductors for an electric aircraft is presented. The system includes a plurality of electrical devices and an electrical bridging device electrically connected to each electrical device of the plurality of devices. The electrical bridging device includes a laminated busbar and a plurality of flexible contactors, wherein each flexible contactor is configured to attach the laminated busbar to each electrical device of the plurality of electrical devices, apply pressure to each electrical device as a function of at least a spring, and provide electrical connection to the electric aircraft as a function of the tension of the at least a spring.

20 Claims, 10 Drawing Sheets

(56) References Cited

U.S. PATENT DOCUMENTS

2020/0385130 A1* 12/2020 Verna ................ H02K 7/14
2020/0389005 A1* 12/2020 Koizumi ............. H01R 11/01
2021/0399539 A1* 12/2021 Koizumi ............. H02G 5/005

OTHER PUBLICATIONS

Prashant Singh, Extensive review on Laminated bus bar for low and high power applications, Feb. 22, 2019.
Dongguan Maruix Electronic Materials Co., Ltd, Power battery expansion joint laminated copper bus bar flexible connectors, Dec. 31, 2017.
Mettex Electric Co. Ltd, Flexible Busbar Connectors, Dec. 31, 2021.
By Interplex, Busbars: Understanding What They Are and Their Critical Roles In Power Applications, Dec. 21, 2018.

* cited by examiner

SYSTEMS AND METHODS FOR LAMINATED BUSWORK WITH FLEXIBLE CONDUCTORS FOR AN ELECTRIC AIRCRAFT

FIELD OF THE INVENTION

The present invention generally relates to the field of laminated busbar. In particular, the present invention is directed to systems and methods for laminated buswork with flexible conductors for an electric aircraft.

BACKGROUND

The assembly of electrical systems and high voltage equipment in an electric vehicle may be prone to a domino effect of greater electrical problems as the power distribution between such systems and equipment are not properly managed. Presently, the electric power distribution of some electric vehicles are inefficient and unreliable. Specifically, the mechanisms and materials used for electric power distribution result in limiting the capabilities of some electric vehicles. Unreliable electric power distribution may result in thermal runways and various electrical hazards which are detrimental in the operation of electric vehicles such as electric aircrafts.

SUMMARY OF THE DISCLOSURE

In an aspect, a system for a laminated buswork with flexible conductors for an electric aircraft is presented. The system includes a plurality of electrical devices and an electrical bridging device electrically connected to each electrical device of the plurality of devices. The electrical bridging device includes a laminated busbar and a plurality of flexible contactors, wherein each flexible contactor is configured to attach the laminated busbar to each electrical device of the plurality of electrical devices, apply pressure to each electrical device as a function of at least a spring, and provide electrical connection to the electric aircraft as a function of the tension of the at least a spring.

In another aspect, a method for a laminated buswork with flexible conductors for an electric aircraft is presented. The method includes attaching the laminated busbar of an electrical bridging device to each electrical device of a plurality of electrical devices as a function of a plurality of flexible contactors, applying pressuring to each electrical device as a function of at least a spring, and providing electrical connection to the electric aircraft as a function of the tension of the at least a spring.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
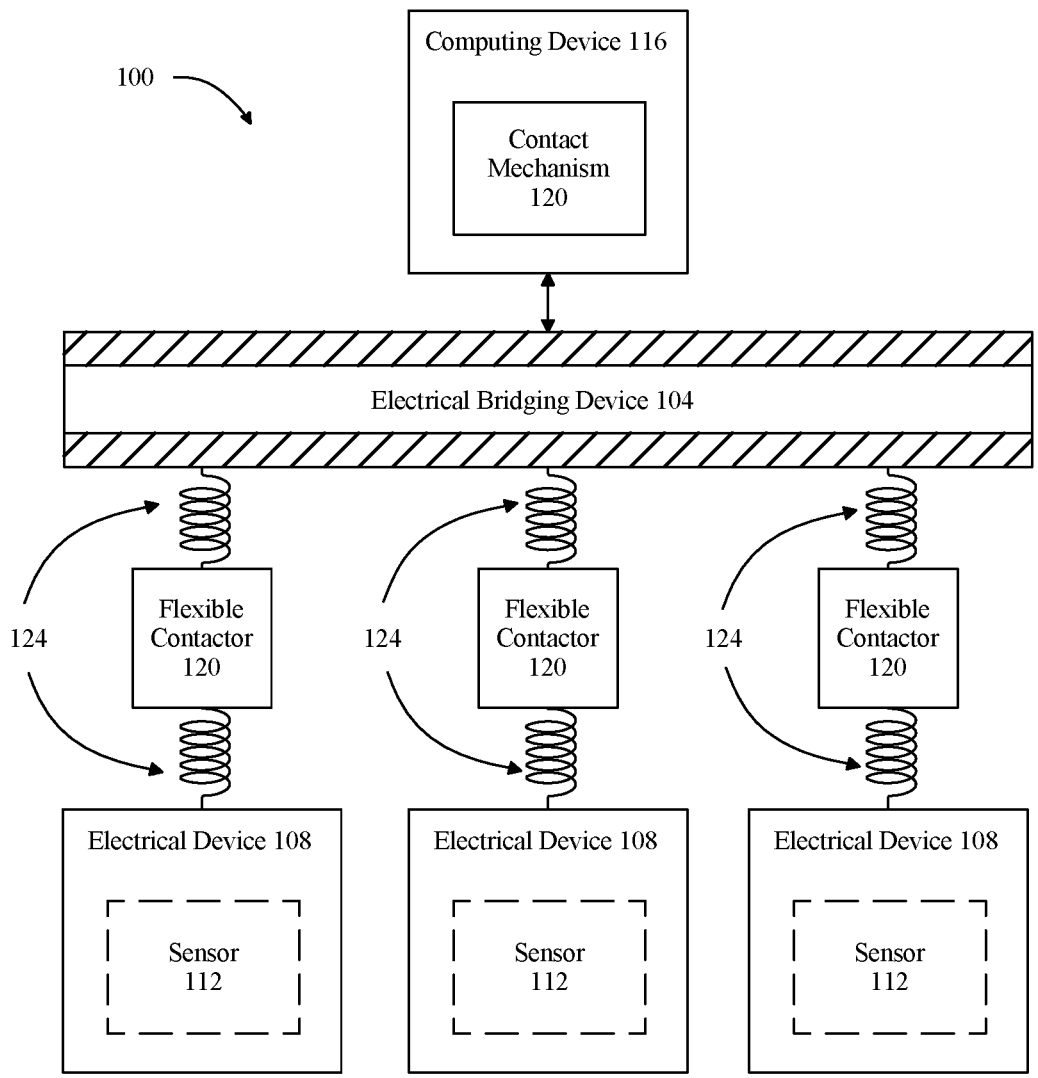
FIG. 1 is a block diagram of an exemplary embodiment of a system for a laminated buswork with flexible conductors for an electric aircraft.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for a laminated buswork with flexible conductors for an electric aircraft. A "laminated buswork," as in used in this disclosure, is a group of conductive devices used to connect a plurality of multiple electrical circuits in a given area. In an embodiment, aspects of the present disclosure can be used for electric aircrafts such as an electric vertical take-off and landing (eVTOL) aircraft. Aspects of the present disclosure can include a laminated buswork comprising of one or more busbars with flexible contactors. In an embodiment, the flexible contactors can be conductors in the form of fingers, spirals, folds, terminal tabs, etc., made up of highly conductivity materials. The flexible contactors can be perpendicular to the busbar and collect the generated DC current and deliver it to the busbars. This is so, at least in part, because the use of flexible contactors avoid current crowding and uniformly distribute the current throughout the body of the electric aircraft to each electrical device. Flexible terminals are perpendicular to the plate so as make the terminal joints easy to connect. Aspects of the present disclosure can also be configured in composite materials that include conductive and/or insulative properties. Aspects of the present disclosure can also be used to reduce the overall weight of the electric aircraft in which the laminated buswork is incorporated in. This is so, at least in part, because. Laminated buswork make the battery packs free from wiring problems occurring due to vibrations from heavy vehicles, resulting in avoiding large transient spikes allows for longer operating time and poses a lighter weight. In an embodiment the laminated buswork can support ventilation and battery/thermal management by acting as a heat sink.

Aspects of the present disclosure can be used distribute electric power to a plurality of electrical devices of the electric aircraft. In a non-limiting embodiment, the laminated buswork may include at least a busbar with flexible components disposed within the body of the electric aircraft and efficiently connect the plurality of electrical devices (e.g. flight components, propulsors, landing gear, wings, ailerons, motors, etc.) located in various locations within or on the electric aircraft. This is so, at least in part, so the electric aircraft can distribute power to every electrical devices that are crucial to operating the electric aircraft efficiently and equally.

Aspects of the present disclosure can also be used to distribute electrical power from a plurality of energy sources within the electric aircraft. In an embodiment, the laminated buswork may connect a plurality of battery packs to each other. In an embodiment, aspects of the present disclosure may include a terminal block used to connect cables and wires to the electrical devices and power them through the distribution of electrical power by the laminated buswork. In another embodiment, aspects of the present disclosure can be used to connect a plurality of battery modules within a battery pack in parallel/series configurations. This is so, at least in part, because a laminated buswork can include a busbar made of conductive materials with conductive properties, wherein the busbar is essentially an electric conductor and ground plane separated by an insulator. In an embodiment, the bus bar can be made of composite materials comprising of layers of sheets that have conductive and/or insulative properties, wherein the composite sheets include circuit paths for signals as well as for distributing power. In an embodiment, the busbar may include conductive pathways that allow for the transfer of data involving the energy sources and/or electric power distribution within the electric aircraft. This is so, at least in part, for the laminated buswork to maintain reliable connection with certain battery packs and/or battery modules, while also being able to isolate and disconnect from other battery packs and/or battery modules. In an embodiment, the electric aircraft may perform a variety of mechanism for distributing power. This is so, at least in part, so that the electric aircraft and its computers can detect any abnormalities within its energy sources and apply those mechanisms accordingly in order to optimize efficiency and operability of the electric aircraft, in flight or grounded.

Aspects of the present disclosure can be used to for charging purposes. In an embodiment, the electric aircraft and its sensors and computers may detect the specific energy sources that require recharging. The laminated buswork may be configured to form a reliable connection with the energy sources requiring charging while losing connection with energy sources are not. This is so, at least in part, to minimize any loss of electrical energy within the power distribution of recharging the depleted energy sources. Aspects of the present disclosure can be used to thermal runaway by disconnecting battery modules in the event of an abnormality or potentially hazardous events. Aspects of the present disclosure can also be used to reduce a likelihood of a short circuit situation during the hazardous events. This is so, at least in part, because by breaking an electrical bus which connects one or more battery cells a length of the electrical bus, which can be short circuited may be reduced, as well as total potential within the laminated buswork.

In another embodiment, aspects of the present disclosure can include a main busbar and an auxiliary busbar. This is so, at least in part, because the continuity of the supply of electrical energy remains same even in a fault. When the fault occurs on any of the busbars the entire load is shifted to the auxiliary busbar. In another embodiment, aspects of the present disclosure can allow for the managing of the supply of electrical energy by using conductive contactors configured to join the laminated busbar and electrical devices and/or the terminals of the electrical devices together. For example, the conductive contactors may include a spring that can be used to allow for a greater variety of tension and movement for the subsystems of the present disclosure to endure without losing physical and electrical connection with the laminated busbar and the electrical devices. Aspects of the present disclosure can include any closing/opening mechanism to compress the electrical devices and the laminated busbar together to form a secure and compressed tension and connection by the spring. Alternatively, the spring may jump back into its natural state in the event the electrical device is positioned further from the bus bar. This so, at least in part, to maintain reliable connection but also be able to reestablish the connection easier in the event an electrical device is misplaced or is to be connected. Exemplary embodiments illustrating aspects of the present disclosure are described below in the context of several specific examples.

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to orientations as illustrated for exemplary purposes in FIG. 5. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply embodiments of the inventive concepts defined in the appended claims. Hence, specific dimensions and other physical characteristics relating to the embodiments disclosed herein are not to be considered as limiting, unless the claims expressly state otherwise.

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply embodiments of the inventive concepts defined in the appended claims. Hence, specific dimensions and other physical characteristics relating to the embodiments disclosed herein are not to be considered as limiting, unless the claims expressly state otherwise.

Now referring to FIG. 1, a block diagram of an exemplary embodiment of a system 100 for a laminated buswork with flexible conductors for an electric aircraft is presented. System 100 may be used for any electric vehicle and/or electric aircraft, such as, but not limited to, electric vertical take-off and landing (eVTOL) aircraft, unmanned aerial vehicle (UAV), helicopter, drone, etc. In a non-limiting embodiment, system 100 may include an electrical bridging device 104. An "electrical bridging device" as used in this disclosure, is a component including a metallic strip or bar configured for local high current/voltage power distribution. For instance and without limitation, electrical bridging device 104 may be consistent with the electrical bridging device in U.S. patent application Ser. No. 17/405,365, and entitled, "BATTERY ASSEMBLY FOR AN AIRCRAFT," which is incorporated by reference herein in its entirety. In a non-limiting embodiment, electrical bridging device 104 may include any bus element in U.S. patent application Ser. No. 17/348,240, and entitled "SYSTEM AND METHOD FOR DYNAMIC EXCITATION OF AN ENERGY STORAGE ELEMENT CONFIGURED FOR USE IN AN ELECTRIC AIRCRAFT," the entirety of which is incorporated herein by reference.

Still referring to FIG. 1, electrical bridging device 104 may include and/or be made up of any conductive element. A conductive element may include copper, brass, aluminum, and/or other conductive elements. In some embodiments, electrical bridging device 104 may include any flexible material. In other embodiments, electrical bridging device 104 may include a rigid material. Electrical bridging device 104 may include a switchboard and/or switchgear. In some embodiments, electrical bridging device 104 may be configured to include a curved structure. In some embodiments, electrical bridging device 104 may include a plurality of curved structures. In some embodiments, electrical bridging device 104 may include a braided structure. A braided structure may include a plurality of conductive wires that may be wrapped into a single braid. A braided structure may allow for a flexibility of electrical bridging device 104. In some embodiments, electrical bridging device 104 may include a laminated structure. Electrical bridging device 104 may include a plurality of layers of laminated materials and/or conductive materials. In a non-limiting example, electrical bridging device 104 may include a structural frame surrounding a plurality of thin conductor layers. In some embodiments, electrical bridging device 104 may include a busbar. In some embodiments, electrical bridging device 104 may include a shape. A shape may include, but is not limited to, a rectangular, hexagonal, circular, square, triangular, and/or other shapes. In some embodiments, electrical bridging device 104 may include a flat, bar, and/or rod shape.

With continued reference to FIG. 1, electrical bridging device 104 may include a laminated busbar. A "laminated busbar," for the purpose of this disclosure, is an engineered component consisting of layers of conducting material, such as without limitation fabricated copper, separated by thin dielectric materials, laminated into a unified structure. In a non-limiting embodiment, a laminated busbar may be integrated within the electric aircraft and covering the interior of the body of the electric aircraft while connecting to a plurality of electrical devices 108 for electric power distribution. "Electric power distribution," for the purpose of this disclosure, is a distribution of electrical power from power sources of the aircraft, such as without limitation battery packs, throughout an electric aircraft's subsystems. The electric power distribution may be distributed evenly or managed by a computing device 116. In a non-limiting embodiment, the electric power distribution may include distributing electrical energy based on a triage manner. For example and without limitation, while the lowest possible resistance and inductance values are to be preferred in a busbar for electric aircraft power distribution, some busbars for that purpose have capacitance added in different ways to increase the charge-carrying capabilities of the power-distribution structure. In another embodiment, the laminated busbar may include any common connection in electrical parlance to which any number of loads, which may be connected in parallel, and share a relatively similar voltage may be electrically coupled. In a non-limiting embodiment, the laminated busbar may include, but not limited to, power busses, audio busses, video busses, computing address busses, and/or data busses. The laminated busbar may be responsible for conveying electrical energy stored in electrical devices 108 such as battery packs and/or battery modules to at least a portion of electric aircraft such as flight components. The same or a distinct laminated busbar may additionally or alternatively responsible for conveying electrical signals generated by any number of components to any destination on or offboard the electric aircraft. An end cap may comprise wiring or conductive surfaces only in portions required to electrically couple the laminated busbar to electrical power or necessary circuits to convey that power or signals to their destinations. Persons skilled in the art, upon reviewing the entirety of this disclosure, will be aware of the various functions of a laminated busbar in the context of power distribution.

With continued reference to FIG. 1, an "electrical device," as used in this disclosure, is an electrical subsystem of the electric aircraft that provides electrical energy, physical motion, aircraft movement, and the like thereof by producing and/or consuming electrical energy. Electrical device 108 may include any computing device as described in the entirety of this disclosure. In a non-limiting embodiment, electrical device 108 may include, but not limited to, a battery module, battery pack, flight component, actuator, or combination thereof. In another non-limiting embodiment, system 100 may include a plurality of electrical devices 108. For example and without limitation, system 100 may include a plurality of electrical device 108 such as a plurality of battery storage units connected by electrical bridging device 104 of the laminated buswork of system 100. A "battery storage unit," for the purposes of this disclosure, refer to a device or station that may include a plurality of batteries to be used to store electrical energy. For instance and without limitation, the battery storage unit may be consistent with the battery storage system in U.S. patent application Ser. No. 17/373,863 and titled, "SYSTEM FOR CHARGING FROM AN ELECTRIC VEHICLE CHARGER TO AN ELECTRIC GRID," which is incorporated in its entirety herein. In a non-limiting embodiment, the plurality of battery storage units may include a plurality of battery packs. A "battery pack," for the purpose of this disclosure, is a set of any number of individual battery modules or identical battery modules. A "battery module", for the purpose of this disclosure, is a source of electric power consisting of one or more electrochemical cells. In a non-limiting embodiment, the battery modules may include a battery cell and/or a plurality of battery cells. In a non-limiting embodiment, the battery module may be electrically connected to another battery module of a plurality of battery modules. "Electrical connection," for the purpose of this disclosure, is a link that allows of the transfer of electrical energy from one electrical device to another. For example and without limitation, battery modules 124 may work in tandem with each to power a flight component. For example and without limitation, a battery module may compensate for a faulty battery module. In a non-limiting embodiment, may include at least a cell, such as a chemoelectrical, photo electric, or fuel cell. The battery packs may include, without limitation, a generator, a photovoltaic device, a fuel cell such as a hydrogen fuel cell, direct methanol fuel cell, and/or solid oxide fuel cell, or an electric energy storage device; electric energy storage device may include without limitation a capacitor, an inductor, an energy storage cell and/or a battery. Plurality of battery packs may be capable of providing sufficient electrical power for auxiliary loads, including without limitation lighting, navigation, communications, de-icing, steering or other systems requiring power or energy. A "flight component", for the purposes of this disclosure, is any component related to, and mechanically connected to an aircraft that manipulates a fluid medium in order to propel and maneuver the aircraft through the fluid medium. For example and without limitation, a flight component may include, propellers, vertical propulsors, forward pushers, landing gears, rudders, motors, rotors, and the like thereof. The battery packs may include a battery management system integrated into the battery pack. For instance and without limitation, battery management system may be consistent with the disclosure of any battery management system in U.S. patent application Ser. No. 17/128,798 and title SYSTEMS AND METHODS FOR A BATTERY MANAGEMENT SYSTEM INTEGRATED IN A BATTERY PACK CONFIGURED FOR USE IN ELECTRIC AIRCRAFT," which is incorporated herein by reference in its entirety. Persons skilled in the art, upon reviewing the entirety of this disclosure, will be aware of the various flight components that may represent the battery packs consistently with this disclosure.

Figure 2:
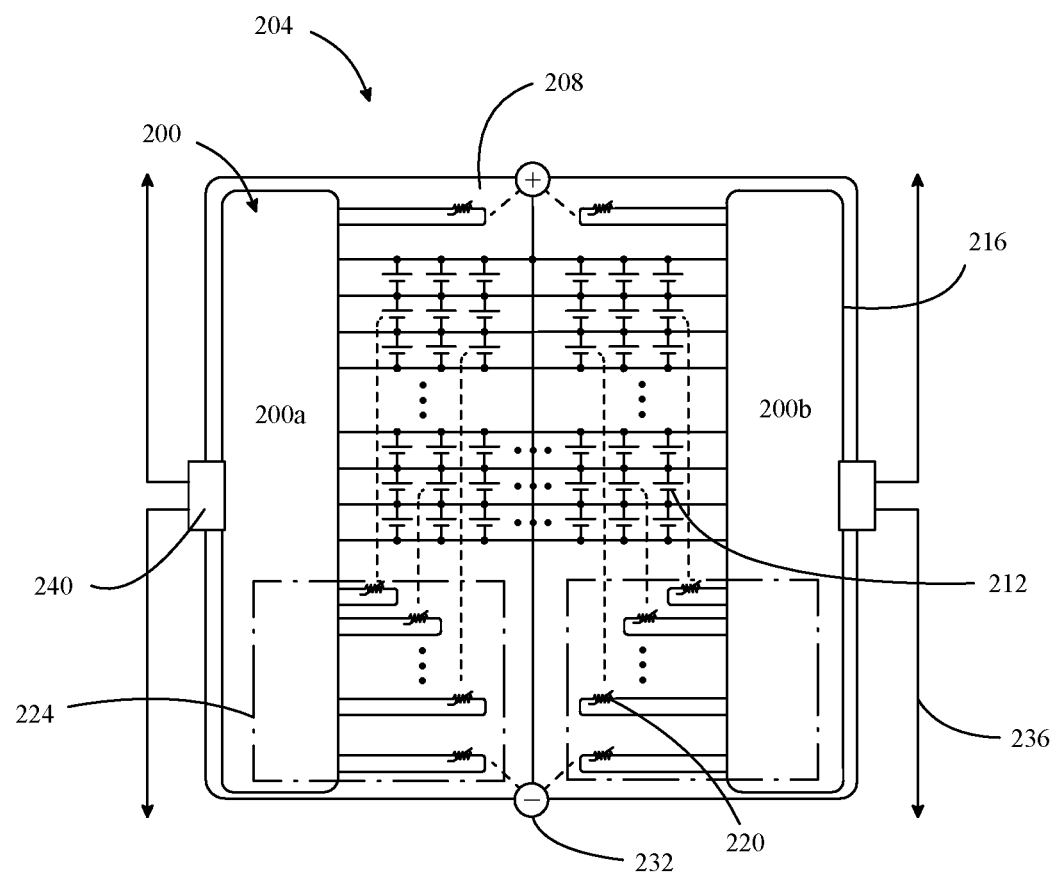
FIG. 2 is a block diagram of an exemplary embodiment of a module monitor unit in one or more aspect of the present disclosure.

With continued reference to FIG. 1, in a non-limiting embodiment, electrical bridging device 104 may be used to connect a plurality of electrical devices 108 such as a plurality of battery modules, wherein the battery module is further described in FIG. 2. This is so, at least in part, for even and/or managed electrical power distribution among the plurality of battery modules in order to power various subsystems of the electric aircraft. In another non-limiting embodiment, electrical bridging device 104 may be used to connect a plurality of electrical devices 108 such as a plurality of battery packs comprising battery modules. The battery pack may be further described in FIG. 3. This is so, at least in part, to distribute electrical power between a plurality of battery packs of an electric aircraft throughout the subsystems of the electric aircraft. In a non-limiting embodiment, each battery pack may be associated with providing electrical energy to specific and/or unique subsystems and/or flight components of the electric aircraft. Each battery pack may be configured to compensate for any missing, malfunctioning, faulty, and/or abnormal battery pack as a function of electrical bridging device 104 and its electric power distribution. In a non-limiting embodiment, the electric distribution may be generated by computing device 116 integrated with electrical bridging device 104. In another embodiment, electrical bridging device 104 may be used to connect a plurality of electrical devices 108 such as a plurality of flight components. Electrical bridging device 104 may be wrapped within the body of the electric aircraft and stretch throughout the electric aircraft and form an electrical connection with each flight component. This is so, at least in part, for electrical bridging device 104 to distribute electric power to each flight component. In a non-limiting embodiment, electrical bridging device 104 may include a terminal block to distribute electrical power from the energy storage unit of the electric aircraft, such as the plurality of battery packs and/or the plurality of battery modules. Persons skilled in the art, upon reviewing the entirety of this disclosure, will be aware of the various embodiments of electrical connections in the context of busbars and electric power distribution.

Still referring to FIG. 1, the laminated bus bar may include at least a composite sheet comprising of conductive materials. At least a "composite sheet," for the purpose of this disclosure, is a conductive sheet or "skins" with a with a core of polyethylene, bonded or "sandwiched" in between two or more conductive sheets. In a non-limiting embodiment, the composite sheet may include aluminum composite sheets configured to provide a lightweight yet rigid panel capable of withstanding the outdoor elements. In a non-limiting embodiment, electrical bridging device 104 may include a plurality of composite sheets. In some embodiments, the at least a composite sheet may include one or more of a composite material with voids, and/or a compressible fluid, such as without limitation air or nitrogen. In some cases, compressible material may include an incompressible fluid such as without limitation oil and/or grease. In some cases, the compressible material includes a foam or a cellular matrix. In some embodiments, the compressible material may be flanked on one or more sides by the at least a composite sheet. In some cases, the at least a composite sheet may include non-conductive and serve to prevent short circuiting of one or more battery modules. In another non-limiting embodiment, the at least a composite sheet may include one or more polymers, such as without limitation polytetrafluoroethylene (PTFE), polyethylene (PE), and the like.

Still referring to FIG. 1, in a non-limiting embodiment, the laminated busbar of electrical bridging device 104 may include a bus element consistent with the bus element in U.S. patent application Ser. No. 17/348,240 and titled "SYSTEM AND METHOD FOR DYNAMIC EXCITATION OF AN ENERGY STORAGE ELEMENT CONFIGURED FOR USE IN AN ELECTRIC AIRCRAFT," which is incorporated by reference herein in its entirety. In a non-limiting embodiment, the bus element may include one or more electrically conductive pathways configured to transfer electrical energy across the pathways to convey electrical energy from one component to one or more other components. In another non-limiting embodiment, the bus element may include, without limitation, one or more metallic strips and/or bars. Alternatively or additionally, electrical bridging device 104 may include a laminated busbar forming a ring, such as a ring bus. For instance and without limitation, the ring bus may be consistent with ring bus found in U.S. patent application Ser. No. 17/348,240 and titled "SYSTEM AND METHOD FOR DYNAMIC EXCITATION OF AN ENERGY STORAGE ELEMENT CONFIGURED FOR USE IN AN ELECTRIC AIRCRAFT," which is incorporated by reference herein in its entirety.

With continued reference to FIG. 1, in a non-limiting embodiment, the laminated busbar may include component configured to isolate a fault by tripping two circuit breakers while all other circuits remain in service. The laminated busbar may be disposed in or on a switchgear, panel board, busway enclosure, plurality of energy storage elements, any electrical device, or any portion of electric aircraft. The laminated busbar may also be used to connect high voltage equipment at electrical switchyards, and low voltage equipment in plurality of energy storage elements. The laminated busbar may be uninsulated; the laminated busbar may have sufficient stiffness to be supported in air by insulated pillars. These features allow sufficient cooling of the conductors, and the ability to tap in at various points without creating a new joint. The laminated busbar may include material composition and cross-sectional size configured to conduct electricity where the size and material determine the maximum amount of current that can be safely carried. The laminated busbar may be produced in a plurality of shapes including flat strips, solid bars, rods, or a combination thereof. The laminated busbar may be composed of copper, brass, aluminum as solid or hollow tubes, in embodiments. The laminated busbar may include flexible buses wherein thin conductive layers are sandwiched together; such an arrangement may include a structural frame and/or cabinet configured to provide rigidity to the laminated busbar. The laminated busbar may include distribution boards configured to split the electrical supply into separate circuits at one location. Busways, or bus ducts, are long busbars with a protective cover. Rather than branching from the main supply at one location, they allow new circuits to branch off anywhere along the route of the busway. The laminated busbar may either be supported on insulators, or else insulation may completely surround it. Busbars are protected from accidental contact either by an enclosure or by design configured to remove it from reach. The laminated busbar may be connected to each other and to electrical apparatus by bolted, clamped, or welded connections. Joints between high-current the laminated busbar sections have precisely machined matching surfaces that are silver-plated to reduce the contact resistance. Persons skilled in the art, upon reviewing the entirety of the various embodiment of a busbar for purposes as described herein.

Still referring to FIG. 1, electrical bridging device 104 may include a plurality of flexible contactors 120 configured to attach the laminated busbar to each electrical device 108 of the plurality of electrical devices. A "flexible contactor" for the purpose of this disclosure, is a flexible conductive connector used to join an electrical device to the laminated busbar and form an electrical connection. Flexible contactor 120 may include, but not limited to, spirals, fingers, terminals tabs, and the like thereof. In a non-limiting embodiment, flexible contactor 120 may include any connectors. Flexible contactor 120 may be incorporated onto the laminated busbar and configured to secure a joining of an electrical device 108. Flexible contactor 120 may be configured to be in a perpendicular position. This is so, at least in part, because the perpendicular configuration can allow for easier joining and/or connecting of any protruding terminal joints, tabs flaps, etc., of either the laminated busbar or electrical device 108. In a non-limiting embodiment, flexible contactor 120 may be configured to collect generated electric power from electrical device 108 to the busbar. Persons skilled in the art, upon reviewing the entirety of this disclosure, will be aware of the various embodiments for connectors in the context of securing connections for busbars.

With continued reference to FIG. 1, flexible contactor 120 may include a cross tie element. As used in this disclosure, a "cross tie element" is a device or protocol configured to disconnect and electrically isolate a portion of elements connected to electrical bridging device 104 from the rest of the elements connected to electrical bridging device 104. For instance and without limitation, the cross tie element may be consistent with the cross tie element in U.S. patent application Ser. No. 17/348,240 and titled "SYSTEM AND METHOD FOR DYNAMIC EXCITATION OF AN ENERGY STORAGE ELEMENT CONFIGURED FOR USE IN AN ELECTRIC AIRCRAFT," which is incorporated by reference herein in its entirety. In a non-limiting embodiment, the cross tie element may include a mechanical, electromechanical, hydraulic, pneumatic, or other type of device configured to actuate a portion of the laminated busbar. The cross tie element may include one or more relays connected to an electrical circuit configured to open or close another circuit as a function of the manipulation of a separate electrical circuit. For example, and without limitation, the cross tie element may be configured to receive a datum, more than one elements of data, command, signal, or other communication to engage or disengage to disconnect at least a portion of plurality of electrical devices 108 from the plurality of electrical devices 108. The cross tie element may include a switch configured to operate in one of two positions, an open and a closed position. The cross tie element may include electrically actuated switches including transistors, bipolar junction transistors (BJT), field-effect transistors (FETs), metal oxide field-effect transistors (MOSFETs), a combination thereof, or other nondisclosed elements alone or in combination. Cross tie element may include a bus tie element joining two or more elements or groups thereof.

With continued reference to FIG. 1, electrical bridging device 104 may include a circuit breaker of a plurality of circuit breakers, wherein each circuit may include flexible contactor 120. A "circuit breaker," for the purpose of this disclosure, is an automatically operated electrical switch designed to protect an electrical circuit from damage caused by excess current from an overload or short circuit. Electrical bridging device 104 may be configured to support and/or allow overvoltage protection. For instance and without limitation, the overvoltage protection provided by system 100 may be consistent with the system for overvoltage protection in U.S. patent application Ser. No. 17/515,519 and entitled, "SYSTEM FOR OVERVOLTAGE PROTECTION IN AN ELECTRIC AIRCRAFT AND A METHOD FOR ITS USE," which is incorporated by reference herein in its entirety. In a non-limiting embodiment, electrical bridging device 104 may include a plurality of isolators wherein each isolator is connected to each circuit breaker. The circuit breaker may include a fuse. In a non-limiting embodiment, the circuit breaker may detect a fault of one or more electrical devices 108 and detach the electrical device where the fault originated from while also securing the current flow of the remaining functional electrical devices. Flexible contactor 120 may include at least a spring 124, wherein spring 124 may be configured to apply pressure to each electrical devices and provide electrical connection to the electric aircraft and its subsystems. In a non-limiting embodiment, providing electrical connection may include distributing electrical power. At least a "spring," as used in this disclosure, is a group of tightly wound coils designed to be coiled closely together or coiled loosely together. Spring 124 may include, but not limited to, Breaker springs, closing spring, opening springs, contact springs, mechanism springs, and the like thereof. In a non-limiting embodiment, spring 124 may include a tension spring, wherein the tension spring may be coiled closely together at rest. In another embodiment, spring 124 may include extension springs configured to provide an opposing force when stretched. Spring 124 may be flexible and/or conductive. In a non-limiting embodiment, each electrical device 108 may be connected to the laminated busbar of electrical bridging device 104 via flexible contactor 120 and/or spring 124. The circuit breaker may also be incorporated somewhere between electrical device 108 and the laminated busbar. Persons skilled in the art, upon reviewing the entirety of this disclosure, will be aware of the various embodiments of springs in the context of applying force for connection and power distribution purposes as described herein.

Still referring to FIG. 1, spring 124 may include one or more springs in parallel or in series. In a non-limiting embodiment, flexible contactor 120 may include a configuration of fingers, spirals, folds, and/or tabs to form spring 124. In an embodiment, a circuit breaker may comprise both spring 124 and/or flexible contactor 120 for each connection to electrical device 108. For example and without limitation, the circuit breaker may include primary disconnects. As used in this disclosure, the "primary disconnects" are a set of silver plated copper fingers held together with springs and are permanently mounted to the breaker bushings. In a non-limiting embodiment, the primary disconnects may include spring 124. In a non-limiting embodiment, the disconnect is designed to float, which means they are not rigidly mounted, and allows for any minor misalignment of the breaker to a cubicle of electrical device 108 and/or the laminated busbar of electrical bridging device 104. A "cubicle," for the purpose of this disclosure, is a component of the electrical bridging device that holds the circuit breaker, and the controls and cabling for the electrical bridging device and its electrical power distribution The opening on the disconnect is wider on the outside and tapers smaller at the point where the breaker is fully racked into the connected position. In a non-limiting embodiment, spring 124 does not exert full spring tension on the laminated bus when out of the cubicle, only when inserted into the cubicle. In a non-limiting embodiment, the conductive side of electrical bridging device 104 may expand flexible contactors 124 (e.g. fingers, spirals, folds, etc.) and causes spring 124 to exert pressure on both the breaker and the cubicle. As the breaker is racked into the cubicle, the primary disconnect will be in line with the laminated busbar of electrical bridging device 104 and self-aligns as the breaker is moving to the connect position. The fingers of the primary disconnects are also coated with a lubrication to allow for a smooth insertion and also to protect the silverplating from friction wear. Spring 124 may be used to hold the fingers of the primary disconnects together and/or release the fingers of the primary disconnects, wherein the primary disconnects are attached to a portion of the laminated busbar of electrical bridging device 104 and/or a portion of electrical device 108. For example and without limitation, spring 124 may include a tension spring designed to return to its tightly coiled resting position when releasing the fingers of the primary disconnects and disconnecting any electrical connection between the laminated busbar of electrical bridging device 104 and electrical device 108. In another embodiment, spring 124 may include an extension spring configured to return to return to its loosely coiled resting position when releasing the fingers of the primary disconnects and disconnecting any electrical connection between the laminated busbar of electrical bridging device 104 and electrical device 108. For example and without limitation, the extension springs may apply pressure to push electrical device 108 and the laminated busbar of electrical bridging device 104 away from each other, wherein the extension spring may be fully extended at its resting position without coming into contact with either the laminated busbar or electrical device 108, depending on where the extension springs are configured onto. If a physical contact by spring 124, which may be a part of flexible contactor 120, is not made with the laminated busbar and/or electrical device 108, it may return to its resting position. In a non-limiting embodiment, the actions by spring 124 and/or flexible contactor 120 in the holding and/or releasing of the components for connecting the laminated busbar and electrical devices 108 may be performed as a function of a contact mechanism 120.

With continued reference to FIG. 1, a "contact mechanism," as used in this disclosure a system of working parts within the electric aircraft involving the electrical bridging device and electrical devices used to establish an electrical connection. In a non-limiting embodiment, contact mechanism 120 may be initiated by computing device 116. In a non-limiting embodiment, computing device 116 may include a flight controller. Computing device 116 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. computing device 116 may include a single computing device operating independently, or may include two or more computing device operating in concert, in parallel, sequentially or the like; two or more computing devices may be included together in a single computing device or in two or more computing devices. computing device 116 may interface or communicate with one or more additional devices as described below in further detail via a network interface device. Network interface device may be utilized for connecting computing device 116 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. computing device 116 may include but is not limited to, for example, a computing device or cluster of computing devices in a first location and a second computing device or cluster of computing devices in a second location. computing device 116 may include one or more computing devices dedicated to data storage, security, distribution of traffic for load balancing, and the like. computing device 116 may distribute one or more computing tasks as described below across a plurality of computing devices of computing device, which may operate in parallel, in series, redundantly, or in any other manner used for distribution of tasks or memory between computing devices. computing device 116 may be implemented using a "shared nothing" architecture in which data is cached at the worker, in an embodiment, this may enable scalability of system 100 and/or computing device.

With continued reference to FIG. 1, computing device 116 may be designed and/or configured to perform any method, method step, or sequence of method steps in any embodiment described in this disclosure, in any order and with any degree of repetition. For instance, computing device 116 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. computing device 116 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, contact mechanism 120 may be triggered by a fault, abnormality, event, or combination thereof, involving any electrical device 108. In a non-limiting embodiment, electrical bridging device 104 may include any machines and/or electrical parts configured to perform any action on electrical bridging device 104 and/or electrical devices 108 to form and/or dissolve any electrical connection. In a non-limiting embodiment, contact mechanism 120 may be configured to join electrical device 104 and the laminated busbar as a function of flexible contactor 120 and fully compress spring 124. Spring 124 may include conductive materials and convey electrical energy to the laminated busbar, wherein the laminated busbar may convey and distribute electrical power to the electric aircraft and its subsystems. In another non-limiting embodiment, contact mechanism 120 may be configured to separate electrical device 108 from the laminated busbar as a function of flexible contactor 124 and fully extend spring 124. For example and without limitation, if no contact with electrical device 108 and/or laminated busbar is made, spring 124 is configured to return to its resting state. Contact mechanism 120 may be used to connect and/or disconnect individual electrical devices based on the functionality of each electrical device.

Still referring to FIG. 1, contact mechanism 120 may include a spring connection system. A "spring connection system," for the purpose of this disclosure, is a system of moving parts used to form any connection using springs. In a non-limiting embodiment, the spring connection system may include the tension springs to functions in a manner similar to the conventional clamping yoke. The tension spring also separates the mechanical and electrical functions. The tension spring may be made of high-quality, rust- and acid-resistant steel. It pulls the wire against the galvanized copper busbar. In a non-limiting embodiment, low contact resistance and high corrosion resistance are enabled by the tin surface of the laminated busbar. In a non-limiting embodiment, contact mechanism 120 may be configured to securely hold flexible contactor 120 by spring 124 and maintain a reliable electrical connection between electrical device 108 and/or the laminated busbar of electrical bridging device 104 for charging purposes. For example and without limitation, to reliably recharge electrical device 108, contact mechanism 120 may securely hold the individual components together to allow for optimal transfer of electrical energy in charging electrical device 108. Electrical bridging device 104 may include a portion such as a cubicle, port, terminal, and the like thereof, for an electric charger to be connected to for charging purposes. In a non-limiting embodiment, only specific electrical devices may require charging in which contact mechanism 120 may release spring 124 to detach flexible contactor 124 connecting the electrical device to electrical bridging device 104 and disconnect the electrical devices that do not require charging while securely holding and maintaining connection with those specific electrical devices requiring charging. In another non-limiting embodiment, contact mechanism 120 may join and/or attach any electrical device 108 manually by a pilot of electric aircraft. In some embodiments, contact mechanism 120 may configured spring 124 to apply pressure to either side of spring 124 to ensure secure physical connection and/or contact with the laminated busbar and/or electrical device 108, therefor providing electrical connection to the subsystems of the electric aircraft and allow for electrical bridging device 104 to distribute electrical power.

With continued reference to FIG. 1, each electrical device 108 may include a sensor 112. A "sensor," for the purpose of this disclosure, is a device that is configured to detect an input and/or a phenomenon and transmit information related to the detection. For example, and without limitation, a sensor may transduce a detected phenomenon, such as without limitation, temperature, voltage, current, pressure, and the like, into a sensed signal. Sensor 112 may include any computing device as described herein. In a non-limiting embodiment, sensor 112 may include one or more pack monitor units (PMU) attached to electrical device 108, wherein electrical device 108 may include a battery pack. In a non-limiting embodiment, sensor 112 may include a plurality of module monitor units (MMU) attached to a battery module of a plurality of battery modules. For instance and without limitation, the pack monitor unit may be consistent with the pack monitor unit in U.S. patent application Ser. No. 17/529,447 and entitled "MODULE MONITOR UNIT FOR AN ELECTRIC AIRCRAFT BATTERY PACK AND METHODS OF USE," which is incorporated by reference herein in its entirety. In another instance and without limitation, the module monitor unit may be consistent with the MMU in U.S. patent application Ser. No. 17/529,447. In one or more embodiments, and without limitation, sensor 112 may include a plurality of sensors. In one or more embodiments, and without limitation, sensor 112 may include one or more temperature sensors, voltmeters, current sensors, hydrometers, infrared sensors, photoelectric sensors, ionization smoke sensors, motion sensors, pressure sensors, radiation sensors, level sensors, imaging devices, moisture sensors, gas and chemical sensors, flame sensors, electrical sensors, imaging sensors, force sensors, Hall sensors, and the like. Sensor 112 may include any computing device as described in the entirety of this disclosure and configured to convert and/or translate a plurality of signals detected into electrical signals for further analysis and/or manipulation. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. Any datum captured by sensor 112 may include circuitry, computing devices, electronic components or a combination thereof that translates into at least an electronic signal configured to be transmitted to another electronic component. In a non-limiting embodiment, sensor 112 may include a plurality of sensors comprised in a sensor suite. For example and without limitation, sensor 112 may include flow sensors, temperature sensors, altimeters, pressure sensors, proximity sensors, airspeed indicators, position sensors, global positioning system (GPS), humidity sensors, level sensors, gas sensors, wireless sensor networks (WSN), compasses, magnetometers, altitude heading and reference systems (AHRSes), tachometers, etc. In a non-limiting embodiment, sensor 112 may be communicatively connected to the electric aircraft of system 100. As used in this disclosure, "communicatively connected" is defined as a process whereby one device, component, or circuit is able to receive data from and/or transmit data to another device, component, or circuit; communicative connecting may be performed by wired or wireless electronic communication, either directly or by way of one or more intervening devices or components. In an embodiment, communicative connecting includes electrically coupling an output of one device, component, or circuit to an input of another device, component, or circuit. Communicative connecting may include indirect connections via "wireless" connection, low power wide area network, radio communication, optical communication, magnetic, capacitive, or optical coupling, or the like. At least pilot control may include buttons, switches, or other binary inputs in addition to, or alternatively than digital controls about which a plurality of inputs may be received. Persons skilled in the art, upon reviewing the entirety of this disclosure, will be aware of the various embodiments of controlling a cursor for visual data manipulation for purposes as described herein. Persons skilled in the art, upon reviewing the entirety of this disclosure, will also be aware of the various warning symbols that may be employed to grab the attention of a pilot in the context of simulation consistently described in the entirety of this disclosure.

With continued reference to FIG. 1, sensor 112 may include a motion sensor. A "motion sensor", for the purposes of this disclosure is a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. Sensor 112 may include, but not limited to, torque sensor, gyroscope, accelerometer, magnetometer, inertial measurement unit (IMU), pressure sensor, force sensor, proximity sensor, displacement sensor, vibration sensor, and the like. In a non-limiting embodiment, sensor 112 may use of active range finding methods which may include, but not limited to, light detection and ranging (LIDAR), radar, sonar, ultrasonic range finding, forward-looking infrared (FLIR) cameras, enhanced vision systems (EVS), short wave infrared (SWIR) imagers, or the like thereof. In another non-limiting embodiment, sensor 112 may include a moisture sensor. "Moisture", as used in this disclosure, is the presence of water, which may include vaporized water in air, condensation on the surfaces of objects, or concentrations of liquid water. Moisture may include humidity. "Humidity", as used in this disclosure, is the property of a gaseous medium (almost always air) to hold water in the form of vapor. In one or more embodiments, sensor 112 may include electrical sensors. Electrical sensors may be configured to measure voltage across a component, electrical current through a component, and resistance of a component. In one or more embodiments, sensor 112 may include thermocouples, thermistors, thermometers, infrared sensors, resistance temperature sensors (RTDs), semiconductor based integrated circuits (ICs), a combination thereof, or another undisclosed sensor type, alone or in combination. Temperature, for the purposes of this disclosure, and as would be appreciated by someone of ordinary skill in the art, is a measure of the heat energy of a system. Temperature, as measured by any number or combinations of sensors present within sensor 112, may be measured in Fahrenheit (° F.), Celsius (° C.), Kelvin (° K), or another scale alone or in combination. The temperature measured by sensors may comprise electrical signals, such as condition data 108, which are transmitted to their appropriate destination wireless or through a wired connection.

Still referring to FIG. 1, sensor 112 may be installed onto a plurality of flight instruments of the electric aircraft. As used in this disclosure, a "flight instrument," is defined as an instrument used to provide information involving the flight situation of an electric aircraft it is installed on. In some embodiments, the information of the flight situation may include, but not limited to, altitude, attitude, airspeed, vertical speed, heading, and the like thereof. Sensor 112 installed onto the flight instruments may include an accelerometer, a gyroscope, a torque monitor, tachometers, engine temperature gauges, fuel- and oil-quantity gauges, pressure gauges, altimeters, airspeed-measurement meters, vertical speed indicators and/or combination thereof. In another embodiment, sensor 112 may include radars such as, doppler radars, lightning-detection radars, terrain radars, anti-collision warning systems, stall warning systems, etc. In a non-limiting embodiment, various types of sensor 112 may be used to inform the pilot of the electric aircraft or a user interacting with a remote device in communication with the electric aircraft to take proper action and precaution, and prevent any kind of disaster or accident. Any information captured by sensor 112 may be used for ground testing, flight testing, vibration, environment, angle of attack, static, and the like thereof. Sensor 112 may include a sensor suite which may include a plurality of sensors, wherein the sensors may include any sensor described herein.

Still referring to FIG. 1 may be integrated and/or communicatively connected to at least an actuator and/or flight component, a portion thereof, or any subcomponent thereof of the electric aircraft. An "actuator," for the purpose of this disclosure, is a device configured to produce motion. For example and without limitation, sensor 112 may be disposed onto a plurality of actuators and/or flight components such as, vertical propulsors, forward pushers, motors, electric motors, electric energy source, ailerons, rudders, wings, wing tips, tail, etc. In a non-limiting embodiment, flight components and/or actuators may be any part of an electric aircraft that helps it to achieve physical movements by converting energy, often electrical, air, or hydraulic, into mechanical force and enable movement. "Disposed," for the purpose of this disclosure, is the physical placement of an electrical device on a part of an electric aircraft. Persons skilled in the art, upon reviewing the entirety of this disclosure, will be aware of the various placements of a variety of sensors onto a variety of flight components for capturing data related to the functions of the individual flight components.

With continued reference to FIG. 1, sensor 112 may be configured to detect measured aircraft data. A "measured aircraft data," for the purpose of this disclosure, is any signals representing information captured by sensor 112 or any sensor as described in the entirety of this disclosure. In a non-limiting embodiment, the measured aircraft data may include temperature, voltage, wind resistance, pressure, speed, angles, acceleration, flight speed, flight angle, lag, thrust, lift, and the like thereof. Sensor 112 may also detect a plurality of maneuver data. A "plurality of maneuver data," for the purpose of this disclosure, is any collection of information describing completion by the pilot of procedures and concepts that control the electric aircraft, a simulated electric aircraft, and/or the simulator module. For example and without limitation, the plurality of maneuver data may include foundational flight maneuvers, such as straight-and-level turns, climbs and descents, and/or performance maneuvers, such that the application of flight control pressures, attitudes, airspeeds, and orientations are constantly changing throughout the maneuver. For example and without limitation, the plurality of maneuver data may include, ground reference maneuvers, such as turns around a point, s-turns, rectangular ground maneuvering course, eights along A road, eights around pylons, hover taxi, air taxi, surface taxi, and the like. As a further example and without limitation, the plurality of maneuver data may include takeoffs and landings, such as normal takeoff and climb, crosswind takeoff and climb, short field takeoff and climb, normal takeoff from a hover, vertical takeoff to a hover, short field approach and landing, soft field approach and landing, touch and go, power-off 180 approach and landing, normal approach to a hover, crosswind approach to the surface, and the like. The plurality of maneuver data may further include, for example and without limitation, airborne maneuvers, such as trimming the aircraft, slow flight, lazy eights, chandelle, straight and level flight, turns, steep turns, unusual attitudes, spatial disorientation demonstration, hovering, hovering turn, rapid deceleration, reconnaissance procedures, and the like. The plurality of maneuver data, as a further non-limiting example, may include emergency preparedness, such as steep spirals, emergency approach and landing, spins, ditching, autorotation, vortex ring state, retreating blade stall, ground resonance, dynamic rollover, low rotor RPM, systems malfunction, flight diversions, and the like. Further, the plurality of maneuver data may include, as a non-limiting example, instrument procedures, such as aircraft holding procedures, arcing approach, instrument landing system approach, instrument reference climbs and descents, basic attitude instrument flight, and the like. Persons skilled in the art, upon reviewing the entirety of this disclosure, will be aware of various procedures and concepts that may represent the plurality of maneuver data consistently with this disclosure.

With continued reference to FIG. 1, sensor 112 may be configured detect measured state data. A "measured state data," as used in this disclosure, is a datum that is collected via a physical controller area network (CAN) bus unit describing a plurality of functionalities of the electric aircraft. A "physical controller area network bus," as used in this disclosure, is vehicle bus unit including a central processing unit (CPU), a CAN controller, and a transceiver designed to allow devices to communicate with each other's applications without the need of a host computer which is located physically at the electric aircraft. In a non-limiting embodiment, the electric aircraft may include a plurality of physical CAN bus units communicatively connected to the electric aircraft. For instance and without limitation, the physical CAN bus unit may be consistent with the physical CAN bus unit in U.S. patent application Ser. No. 17/218,312 and entitled, "METHOD AND SYSTEM FOR VIRTUALIZING A PLURALITY OF CONTROLLER AREA NETWORK BUS UNITS COMMUNICATIVELY CONNECTED TO AN AIRCRAFT," which is incorporated by reference herein in its entirety. In a non-limiting embodiment, the measured state data may include a plurality of data signals detailing a control to one or more actuators communicatively connected to the aircraft. In a non-limiting embodiment, sensor 112 may transmit any datum and data collected to computing device 116 via electrical bridging device 104, wherein electrical bridging device 104 may include a plurality of physical CAN bus units. Measured state data may include a plurality of data entries relating aircraft pitch, roll, yaw, torque, angular velocity, climb, speed, performance, lift, thrust, drag, battery charge, fuel level, location, and the like. Measured state data may include a plurality of data communicating the status of flight control devices such as proportional-integral-derivative controller, fly-by-wire system functionality, aircraft brakes, impeller, artificial feel devices, stick shaker, power-by-wire systems, active flow control, thrust vectoring, alerion, landing gear, battery pack, propulsor, management components, control surfaces, sensors/sensor suites, creature comforts, inceptor, throttle, collective, cyclic, yaw pedals, MFDs, PFDs, and the like. Measured state data may exist as analogue and/or digital data, originating from physical CAN bus units such as bits, where a series of serial binary data are composed and transmitted relaying a measured state as indicated from a device located within, on, or communicating with the electric aircraft.

Still referring to FIG. 1, sensor 112 may include sensors configured to measure physical and/or electrical parameters, such as, and without limitation, temperature and/or voltage, of electrical device 108. For example, and without limitation, sensor 112 may monitor voltage and/or temperature of battery modules and/or cells of electrical device 108. Sensor 112 may be configured to detect failure within each battery module, for instance and without limitation, as a function of and/or using detected physical and/or electrical parameters. In one or more exemplary embodiments, battery cell failure may be characterized by a spike in temperature and sensor 112 may be configured to detect that increase in temperature and generate signals, which are discussed further below, to notify users, support personnel, safety personnel, flight crew, maintainers, operators, emergency personnel, aircraft computers, or a combination thereof. In other exemplary embodiments, sensor 112 may detect voltage and direct the charging of individual battery cells according to charge level. Detection may be performed using any suitable component, set of components, and/or mechanism for direct or indirect measurement and/or detection of voltage levels, including without limitation comparators, analog to digital converters, any form of voltmeter, or the like.

With continued reference to FIG. 1, sensor 112 may be configured to detect and/or generate an electric device datum. In a non-limiting embodiment, any information, data, datum, and the like thereof, collected by sensor 112 may be compiled into the electric device datum. An "electric device datum," as used in this disclosure, is any collection of information describing the performance and functionalities of electrical device and/or the plurality of electrical device. In a non-limiting embodiment, electric device datum may include a health metric of electrical device 108. In this disclosure, "health metric" is a piece of data concerned with the wellness of a specific component, such as a battery submodule. Health metric may include a discharge-related fault condition. In this disclosure, a discharge-related fault condition is a safety check to ensure no electrical device will be damaged or cause damage if charged. Health metric may include a cell charge capacity. In this embodiment, "cell charge capacity" is the maximum amount of power that electrical device can store; however a cell charge capacity value may represent a percentage of submodules maximum power that is currently stored in the battery. Examples of health metrics may include, without limitation, just a simple "yes" or "no" to whether electrical device 108 may cause damage, a percentage to represent the battery charge capacity value, "temperature too high" or "too low", and the like. Other examples may just include "poor battery health" or "sufficient battery health". The term "health" refers to how well or healthy a component is; for example but without limitation, sensor may detect temperature, rotational speed, missing parts, age, efficiency, voltage, or the like. Additionally, heath metric may be qualitative or quantitative, such as that something is in "good" health or "poor" health.

Still referring to FIG. 1, in some embodiments, to update battery health metric, electrical device 108 must be charged in a specific manner so that a battery management component may estimate health metric. As used in this disclosure, a "battery management component" is a piece of technology attached to the battery whose purpose is to manage health of the battery. The battery management component may be integrated in electrical device 108 of the electric aircraft. In a non-limiting embodiment, the battery management component may be disposed on a portion and/or on either end of electrical device 108, wherein electrical device 108 includes a battery. One of ordinary skill in the art will appreciate that there are various areas in and on a battery submodule and/or subassemblies thereof that may include the battery management component. The battery management component may take any suitable form. In a non-limiting embodiment, the battery management component may include a circuit board, such as a printed circuit board and/or integrated circuit board, a subassembly mechanically coupled to at least a portion of electrical device 108, standalone components communicatively coupled together, or another undisclosed arrangement of components; for instance, and without limitation, a number of components of the battery management component may be soldered or otherwise electrically connected to a circuit board. The battery management component may be disposed directly over, adjacent to, facing, and/or near a battery module and specifically at least a portion of a battery cell. The battery management component includes a sensor. Sensor is configured to detect an altitude value, which is further explained below.

With continued reference to FIG. 1, the battery management component disposed in or on electrical device 108 may be physically isolated from another battery management component also disposed on or in battery submodule. "Physical isolation", for the purposes of this disclosure, refer to a system's components, communicative coupling, and any other constituent parts, whether software or hardware, are separated from a second system's components, communicative coupling, and any other constituent parts, whether software or hardware, respectively. The battery management component may perform the same or different functions in battery system. In a non-limiting embodiment, the battery management component perform the same, and therefore redundant functions. If, for example, one the battery management component malfunctions, in whole or in part, another the battery management component may still be operating properly and therefore battery management system may still operate and function properly for electric aircraft in which it is installed. Additionally or alternatively, the battery management component may power on while another the battery management component is malfunctioning. In non-limiting embodiments, the battery management component may be powered on and operate through the same ground operations of an electric aircraft and through the same flight envelope of an electric aircraft. In non-limiting embodiments, the battery management component, due to their physical isolation, may be configured to withstand malfunctions or failures in the other system and survive and operate. Provisions may be made to shield one battery management component from another other than physical location such as structures, circuit breakers, isolators, and/or fuses.

With continued reference to FIG. 1, in a non-limiting embodiment, to detect such health datums, each battery management component may further comprise sensor 112. Sensor 112 may be is configured to detect a health metric and any measured data/datum and transmit them to computing device 116, wherein computing device 116 may generate and/or modify contact mechanism 120 as a function of the plurality of data. In a non-limiting embodiment, contact mechanism 120 may include a set of instructions for connecting and/or disconnecting as found in contact mechanism 120. In a non-limiting embodiment, contact mechanism 120 may be generated and/or initiated as a function of a machine-learning model generated by computing device 116. The machine-learning model may be trained by a contact training data and generate and/or initiate contact mechanism 120 as a function of the data the electric device datum as an input. A "contact training data," as used in this disclosure, is an element of electric device datum correlated to an element of contact mechanism 120. In some embodiments, the contact training data my include any previous electric device datum correlated to a contact mechanism and/or previous contact mechanism. The previous contact mechanism and previous electric device datum may be retrieved from a database, wherein the database is configured to record, store, and/or retrieve any datum generated by sensor 112 and/or computing device 116. In a non-limiting embodiment, the contact training data may be used to best associate a specific contact mechanism to the electric device datum received by computing device 116. For example and without limitation, the electric device datum may include information denoting an electric device requiring of charging. Computing device 116 may initiate and/or generate contact mechanism 120 wherein the contact mechanism is configured to use a spring connection system to compress the electric device requiring of charging to the laminated bus of electrical bridging device 104 and use spring 124 to hold any flexible contactor 120 to secure an electrical connection with that electrical device 108. Persons skilled in the art, upon reviewing the entirety of this disclosure, will be aware of the various embodiments of securing any connection in the context of electric power distribution of a busbar.

Referring now to FIG. 2, an exemplary embodiment of a module monitor unit (MMU) 200 is presented in accordance with one or more embodiments of the present disclosure. In a non-limiting embodiment, electrical device 108 may include a batter pack of a plurality of battery packs, wherein each battery pack includes a plurality of battery modules. Each battery module may include one or more MMU 200. In one or more embodiments, MMU 200 is configured to monitor an operating condition of a battery pack 204. For example, and without limitation, MMU 200 may monitor an operating condition of a battery module 208 and/or a battery cell 212 of battery pack 204. In a non-limiting embodiment, electrical device 108 may include battery pack 204. In one or more embodiments, MMU 200 may be attached to battery module 208, as shown in FIG. 2. For example, and without limitation, MMU 200 may include a housing 216 that is attached to battery module 208, where circuitry of MMU 200 may be disposed at least partially therein, as discussed further in this disclosure. In other embodiments, MMU 200 may be remote to battery module 208. In one or more embodiments, housing 216 may include materials which possess characteristics suitable for thermal insulation, such as fiberglass, iron fibers, polystyrene foam, and thin plastic films, to name a few. Housing 216 may also include polyvinyl chloride (PVC), glass, asbestos, rigid laminate, varnish, resin, paper, Teflon, rubber, and mechanical lamina to physically isolate components of battery pack 204 from external components. In one or more embodiments, housing 216 may also include layers that separate individual components of MMU 200, which are discussed further below in this disclosure. As understood by one skilled in the art, housing 216 may be any shape or size suitable to attached to battery module 208 of battery pack 204.

Still referring to FIG. 2, in one or more embodiments, a plurality of MMUs 200 may be configured to monitor battery module 208 and/or battery cell 212. For instance, and without limitation, a first MMU 200a may be position at one end of battery module 208, and a second MMU 200b may be positioned at an opposing end of battery module 208. This arrangement may allow for redundancy in monitoring of battery cell 212. For example, and without limitation, if first MMU 200a fails, then second MMU 200b may continue to work properly and monitor the operating condition of each battery cell 212 of battery module 208. In one or more embodiments, MMU 200 may monitor the operating condition of a plurality of battery cells, as shown in FIG. 2. In one or more embodiments, MMU 200 is configured to detect a measurement parameter of battery module 208. For the purposes of this disclosure, a "measurement parameter" is detected electrical or physical input, characteristic, and/or phenomenon related to a state of battery pack 204. For example, and without limitation, a measurement parameter may be a temperature, a voltage, a current, a moisture level/humidity, a gas level, or the like, as discussed further in this disclosure. In one or more embodiments, MMU 200 is configured to perform load-sharing during the charging of battery pack 204. For instance, MMU 200 may regulate charge levels of battery cells 212. For example, charging of battery pack 204 may be shared throughout a plurality of battery cells 212 by directing energy through balance resistors and dissipating current through resistors as heat. For example, and without limitation, resistor may include a nonlinear resistor, such as a thermistor 220. In this manner, battery cells 212 may be charged evenly during recharging of battery pack 204 by, for example, a charging station or an electric grid. For example, and without limitation, battery cells with a lower amount of electrical energy will charge more than battery cells with a greater amount of energy.

With continued reference to FIG. 2, in one or more embodiments, MMU 200 is configured to monitor a temperature of battery module 208. For example, MMU 200 may include a sensor 224 configured to detect a temperature parameter of battery cell 212. For example, and without limitation, sensor 224 may include thermistor 220, which may be used to measure a temperature parameter of battery cell 212. As used in this disclosure, a thermistor includes a resistor having a resistance dependent on temperature. In one or more embodiments, sensor 224 may include circuitry configured to generate a measurement datum correlated to the detected measurement parameter, such as a temperature of battery cell 212 detected by thermistor 220. A thermistor may include metallic oxides, epoxy, glass, and the like. A thermistor may include a negative temperature coefficient (NTC) or a positive temperature coefficient (PTC). Thermistors may be beneficial do to being durable, compact, inexpensive, and relatively accurate. In one or more embodiments, a plurality of thermistors 220 may be used to provide redundant measuring of a state of battery cell 212, such as temperature. In other embodiments, MMU 200 may also include a resistance temperature detector (RTD), integrated circuit, thermocouple, thermometer, microbolometer, a thermopile infrared sensor, and/or other temperature and/or thermal sensors, as discussed further below in this disclosure. In one or more embodiments, thermistor 220 may detect a temperature of battery cell 212. Subsequently, MMU 200 may generate a sensor signal output containing information related to the detected temperature of battery cell 212. In one or more embodiments, sensor signal output may include measurement datum containing information representing a detected measurement parameter.

Still referring to FIG. 2, in one or more embodiments, sensor 224 may include a sensor suite 200 (shown in FIG. 2) or one or more individual sensors, which may include, but are not limited to, one or more temperature sensors, voltmeters, current sensors, hydrometers, infrared sensors, photoelectric sensors, ionization smoke sensors, motion sensors, pressure sensors, radiation sensors, level sensors, imaging devices, moisture sensors, gas and chemical sensors, flame sensors, electrical sensors, imaging sensors, force sensors, Hall sensors, airspeed sensors, throttle position sensors, and the like. In a non-limiting embodiment, sensor 224 may be consistent with sensor 112. Sensor 224 may be a contact or a non-contact sensor. For example, and without limitation, sensor 224 may be connected to battery module 208 and/or battery cell 212. In other embodiments, sensor 224 may be remote to battery module and/or battery cell 212. Sensor 224 may be communicatively connected to controller 320 of PMU 312 (shown in FIG. 3) so that sensor 224 may transmit/receive signals to/from controller 320, respectively, as discussed below in this disclosure. Signals, such as signals of sensor 224 and controller 320, may include electrical, electromagnetic, visual, audio, radio waves, or another undisclosed signal type alone or in combination. In one or more embodiments, communicatively connecting is a process whereby one device, component, or circuit is able to receive data from and/or transmit data to another device, component, or circuit. In an embodiment, communicative connecting includes electrically connecting at least an output of one device, component, or circuit to at least an input of another device, component, or circuit.

Figure 3:
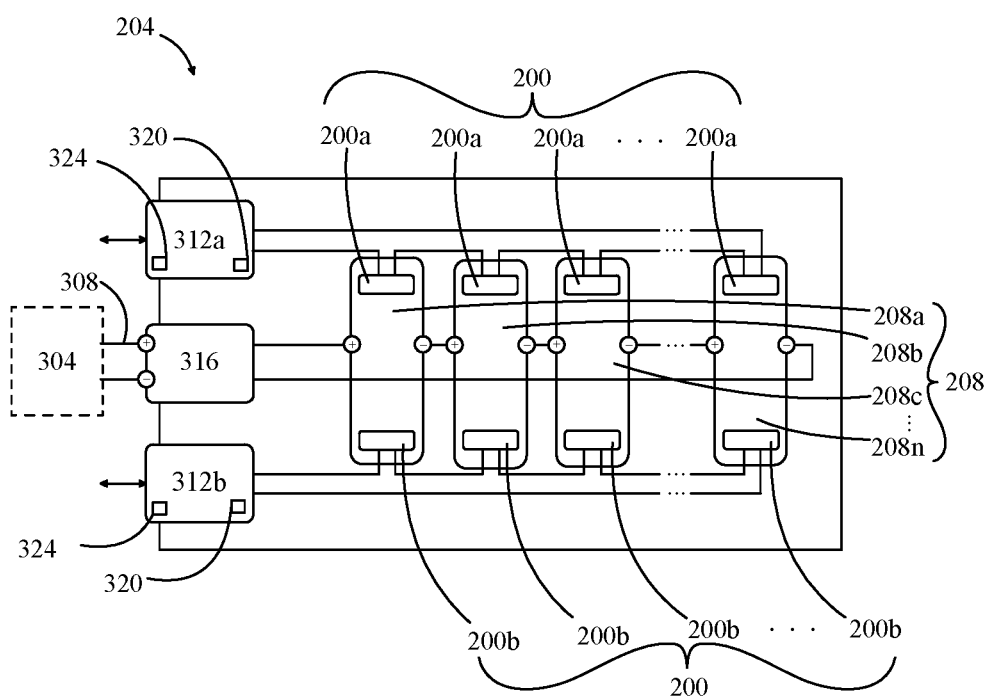
FIG. 3 is a block diagram of an exemplary embodiment of a battery pack in one or more aspects of the present disclosure.

In one or more embodiments, MMU 200 may include a control circuit that processes the received measurement datum from sensor 224, as shown in FIG. 3. In one or more embodiments, control circuit may be configured to perform and/or direct any actions performed by MMU 200 and/or any other component and/or element described in this disclosure. Control circuit may include any analog or digital control circuit, including without limitation a combinational and/or synchronous logic circuit, a processor, microprocessor, microcontroller, any combination thereof, or the like. In some embodiments, control circuit 228 may be integrated into MMU 200, as shown in FIG. 2. In other embodiments, control circuit 228 may be remote to MMU 200. In one or more nonlimiting exemplary embodiments, if measurement datum of a temperature of a battery module 208, such as at a terminal 232, is higher than a predetermined threshold, control circuit 228 may determine that the temperature of battery cell 212 indicates a critical event and thus is malfunctioning. For example, a high voltage (HV) electrical connection of battery module terminal 232 may be short circuiting. If control circuit 228 determines that a HV electrical connection is malfunctioning, control circuit 228 may terminate a physical and/or electrical communication of the HV electrical connection to prevent a dangerous or detrimental reaction, such as a short, that may result in an electrical shock, damage to battery pack 204, or even a fire. Thus, control circuit 228 may trip a circuit of battery pack 204 and terminate power flow through the faulty battery module 208 until the detected fault is corrected and/or the excessively high temperature is no longer detected. Temperature sensors, such as thermistor 220 may assist in the monitoring of a cell group's overall temperature, an individual battery cell's temperature, and/or battery module's temperature, as just described above.

In one or more embodiments, MMU 200 may not use software. For example, MMU 200 may not use software to improve reliability and durability of MMU 200. Rather, MMU 200 may be communicatively connected to a remote computing device, such as computing device 800 of FIG. 8. In one or more embodiments, MMU 200 may include one or more circuits and/or circuit elements, including without limitation a printed circuit board component, aligned with a first side of battery module 208 and the openings correlating to battery cells 212. In one or more embodiments, MMU 200 may be communicatively connected to a remote processing module, such as a controller. Controller may be configured to perform appropriate processing of detected temperature characteristics by sensor 224. In one or more embodiments, the controller may include an application-specific integrated circuit (ASIC), field-programmable gate array (FPGA), a central processing unit (CPU), readout integrated circuit (ROIC), or the like, and may be configured to perform characteristic processing to determine a temperature and/or critical event of battery module 208. In these and other embodiments, controller may operate in conjunction with other components, such as, a memory component, where a memory component includes a volatile memory and/or a non-volatile memory. In one or more embodiments, each MMU 200 may communicate with another MMU 200 and/or a controller via a communicative connection 236. Each MMU may use a wireless and/or wired connection to communicated with each other. For example, and without limitation, MMU 200a may communicate with an adjacent MMU 200a using an isoSPI connection 304 (shown in FIG. 3). As understood by one skilled in the art, and isoSPI connection may include a transformer to magnetically connect and electrically isolate a signal between communicating devices.

Now referring to FIG. 3, a battery pack with a battery management component 300 that utilizes MMU 200 for monitoring a status of battery pack is shown in accordance with one or more embodiments of the present disclosure. In one or more embodiments, the electric aircraft battery pack may be consistent with electrical device 108. In another embodiment, the battery pack may include a battery module 208, wherein the battery module may also be electrical device 108, which is configured to provide energy to an electric aircraft 304 via a power supply connection 308. For the purposes of this disclosure, a "power supply connection" is an electrical and/or physical communication between a battery module 208 and electric aircraft 304 that powers electric aircraft 304 and/or electric aircraft subsystems for operation. In one or more embodiments, the battery pack may include a plurality of battery modules, such as modules 208a-n. For example, and without limitation, the battery pack may include fourteen battery modules. In one or more embodiments, each battery module 208a-n may include a battery cell 212 (shown in FIG. 2).

Still referring to FIG. 3, the battery pack may include a battery management component 220 (also referred to herein as a "management component"). In one or more embodiments, battery management component 300 may be integrated into the battery pack in a portion of the battery pack or a subassembly thereof. In an exemplary embodiment, and without limitation, management component 300 may be disposed on a first end of the battery pack. One of ordinary skill in the art will appreciate that there are various areas in and on a battery pack and/or subassemblies thereof that may include battery management component 300. In one or more embodiments, battery management component 300 may be disposed directly over, adjacent to, facing, and/or near a battery module and specifically at least a portion of a battery cell. In one or more embodiments, battery management component 300 includes module monitor unit (MMU) 200, a pack monitoring unit (PMU) 312, and a high voltage disconnect 316. In one or more embodiments, battery management component 300 may also include a sensor 224. For example, and without limitation, battery management component 300 may include a sensor suite 200 having a plurality of sensors, as discussed further in this disclosure, as shown in FIG. 2.

In one or more embodiments, MMU 200 may be mechanically connected and communicatively connected to battery module 208. As used herein, "communicatively connected" is a process whereby one device, component, or circuit is able to receive data from and/or transmit data to another device, component, or circuit. In an embodiment, communicative connecting includes electrically connecting at least an output of one device, component, or circuit to at least an input of another device, component, or circuit. In one or more embodiments, MMU 200 is configured to detect a measurement characteristic of battery module 208 of the battery pack. For the purposes of this disclosure, a "measurement characteristic" is detected electrical or physical input and/or phenomenon related to a condition state of the battery pack. A condition state may include detectable information related to, for example, a temperature, a moisture level, a humidity, a voltage, a current, vent gas, vibrations, chemical content, or other measurable characteristics of the battery pack, battery module 208, and/or battery cell 212. For example, and without limitation, MMU 200 may detect and/or measure a measurement characteristic, such as a temperature, of battery module 208. In one or more embodiments, a condition state of the battery pack may include a condition state of a battery module 208 and/or battery cell 212. In one or more embodiments, MMU 200 may include a sensor, which may be configured to detect and/or measure measurement characteristic. In a non-limiting embodiment, the sensor may be a device that is configured to detect an input and/or a phenomenon and transmit information and/or datum related to the detection, as discussed further below in this disclosure. Output signal may include a sensor signal, which transmits information and/or datum related to the sensor detection. A sensor signal may include any signal form described in this disclosure, for example digital, analog, optical, electrical, fluidic, and the like. In some cases, a sensor, a circuit, and/or a controller may perform one or more signal processing steps on a signal. For instance, sensor, circuit, and/or controller may analyze, modify, and/or synthesize a signal in order to improve the signal, for instance by improving transmission, storage efficiency, or signal to noise ratio.

In one or more embodiments, MMU 200 is configured to transmit a measurement datum of battery module 208. MMU 200 may generate an output signal such as measurement datum that includes information regarding detected measurement characteristic. For the purposes of this disclosure, "measurement datum" is an electronic signal representing an information and/or a parameter of a detected electrical and/or physical characteristic and/or phenomenon correlated with a condition state of the battery pack. For example, measurement datum may include data of a measurement characteristic regarding a detected temperature of battery cell 212. In one or more embodiments, measurement datum may be transmitted by MMU 200 to PMU 312 so that PMU 312 may receive measurement datum, as discussed further in this disclosure. For example, MMU 200 may transmit measurement data to a controller 320 of PMU 312.

In one or more embodiments, MMU 200 may include a plurality of MMUs. For instance, and without limitation, each battery module 208a-n may include one or more MMUs 200. For example, and without limitation, each battery module 208a-n may include two MMUs 200a,b. MMUs 200a,b may be positioned on opposing sides of battery module 208. Battery module 208 may include a plurality of MMUs to create redundancy so that, if one MMU fails or malfunctions, another MMU may still operate properly. In one or more nonlimiting exemplary embodiments, MMU 200 may include mature technology so that there is a low risk. Furthermore, MMU 200 may not include software, for example, to avoid complications often associated with programming. MMU 200 is configured to monitor and balance all battery cell groups of the battery pack during charging of the battery pack. For instance, and without limitation, MMU 200 may monitor a temperature of battery module 208 and/or a battery cell of battery module 208. For example, and without limitation, MMU may monitor a battery cell group temperature. In another example, and without limitation, MMU 200 may monitor a terminal temperature to, for example, detect a poor HV electrical connection. In one or more embodiments, an MMU 200 may be indirectly connected to PMU 312. In other embodiments, MMU 200 may be directly connected to PMU 312. In one or more embodiments, MMU 200 may be communicatively connected to an adjacent MMU 200.

Still referring to FIG. 3, battery management component 300 includes a pack monitoring unit (PMU) 228 may be connected to MMU 200. In one or more embodiments, PMU 312 includes a controller 320, which is configured to receive measurement datum from MMU 200, as previously discussed in this disclosure. For example, PMU 312a may receive a plurality of measurement data from MMU 200a. Similarly, PMU 312b may receive a plurality of measurement data from MMU 200b. In one or more embodiments, PMU 312 may receive measurement datum from MMU 200 via communicative connections. For example, PMU 312 may receive measurement datum from MMU 200 via an isoSPI communications interface. In one or more embodiments, controller 320 of PMU 312 is configured to identify an operating of battery module 208 as a function of measurement datum. For the purposes of this disclosure, an "operating condition" is a state and/or working order of the battery pack and/or any components thereof. For example, and without limitation, an operating condition may include a state of charge (SoC), a depth of discharge (DoD), a temperature reading, a moisture level or humidity, a gas level, a chemical level, or the like. In one or more embodiments, controller 320 of PMU 312 is configured to determine a critical event element if operating condition is outside of a predetermined threshold (also referred to herein as a "predetermined threshold"). For the purposes of this disclosure, a "critical event element" is a failure and/or critical operating condition of a battery pack, battery cell, and/or battery module that may be harmful to the battery pack and/or electric aircraft 304. For instance, and without limitation, if an identified operating condition, such as a temperature of a battery cell 212 of the battery pack, does not fall within a predetermined threshold, such as a range of acceptable, operational temperatures of the battery cell, then a critical event element is determined by controller 320 of PMU 312. For example, and without limitation, PMU may be used measurement datum from MMU to identify a temperature of 95 degrees Fahrenheit for a battery cell. If the predetermined threshold is, for example, 75 to 90 degrees Fahrenheit, then the determined operating condition is outside of the predetermined threshold, such as exceeding the upper limit of 90 degrees Fahrenheit, and a critical event element is determined by controller 320. As used in this disclosure, a "predetermined threshold" is a limit and/or range of an acceptable quantitative value and/or representation related to a normal operating condition of a battery pack and/or components thereof. In one or more embodiments, an operating condition outside of the threshold is a critical operating condition, which triggers a critical event element, and an operating condition within the threshold is a normal operating condition that indicates that the battery pack is working properly. For example, and without limitation, if an operating condition of temperature exceeds a predetermined threshold, then battery pack is considered to be operating at a critical operating condition and may be at risk of overheating and experiencing a catastrophic failure.

In one or more embodiments, controller 320 of PMU 312 is configured to generate an action command if critical event element is determined by controller 320. Continuing the previously described example above, if an identified operating condition includes a temperature of 95 degrees Fahrenheit, which exceeds a predetermined threshold, then controller 320 may determine a critical event element indicating that the battery pack is working at a critical temperature level and at risk of catastrophic failure. In one or more embodiments, critical event elements may include high shock/drop, overtemperature, undervoltage, high moisture, contactor welding, and the like.

In one or more embodiments, controller 320 may include a computing device (as discussed in FIG. 8), a central processing unit (CPU), a microprocessor, a digital signal processor (DSP), an application specific integrated circuit (ASIC), a control circuit, a combination thereof, or the like. In one or more embodiments, output signals from various components of the battery pack may be analog or digital. Controller 320 may convert output signals from MMU 200 and/or sensor 224 to a usable form by the destination of those signals. The usable form of output signals from MMUs and/or sensors, through processor may be either digital, analog, a combination thereof, or an otherwise unstated form. Processing may be configured to trim, offset, or otherwise compensate the outputs of sensor. Based on MMU and/or sensor output, controller can determine the output to send to a downstream component. Processor can include signal amplification, operational amplifier (Op-Amp), filter, digital/analog conversion, linearization circuit, current-voltage change circuits, resistance change circuits such as Wheatstone Bridge, an error compensator circuit, a combination thereof or otherwise undisclosed components. In one or more embodiments, PMU 312 may run state estimation algorithms.

Still referring to FIG. 3, in one or more embodiments, MMU 200 may be implemented in battery management system 300 of the battery pack. MMU 200 may include sensor 224, as previously mentioned above in this disclosure. For instance, and without limitation, MMU 200 may include a plurality of sensors. For example, MMU 200 may include thermistors 220 to detect a temperature of a corresponding battery module 208 and/or battery cell 212. MMU 200 may include sensor 220 or a sensor suite that is configured to measure physical and/or electrical parameters of the battery pack of power source 116, such as without limitation temperature, voltage, current, orientation, or the like, of one or more battery modules and/or battery cells 212. MMU 200 may configured to generate a measurement datum of each battery cell 212, which a control circuit may ultimately use to determine a failure within battery module 208 and/or battery cell 212, such as a critical event element. Cell failure may be characterized by a spike in temperature and MMU 200 may be configured to detect that increase, which in turn, PMU 312 uses to determine a critical event element and generate signals, to disconnect a power supply connection between electric aircraft* and battery cell 212 and to notify users, support personnel, safety personnel, maintainers, operators, emergency personnel, aircraft computers, or a combination thereof. In one or more embodiments, measurement data of MMU may be stored in memory component 324.

Still referring to FIG. 3, battery management component 300 may include high voltage disconnect 232, which is communicatively connected to battery module 208, wherein high voltage disconnect 232 is configured to terminate power supply connection 212 between battery module 208 and electric aircraft 304 in response to receiving action command from PMU 312. PMU 312 may be configured to determine a critical event element, such as high shock/drop, overtemperature, undervoltage, contactor welding, and the like. High voltage disconnect 232 is configured to receive action command generated by PMU 312 and lock out the battery pack of power source 116 for maintenance in response to received action command. In one or more embodiments, PMU 312 may create a lockout flag, which may be saved across reboots. A lockout flag may include an indicator alerting a user of termination of power supply connection 212 by high voltage disconnect 232. For instance, and without limitation, a lockout flag may be saved in a database od PMU 312 so that, despite rebooting the battery pack of power source 116 or complete loss of power of the battery pack, power supply connection remains terminated and an alert regarding the termination remains. In one or more embodiments, lockout flag cannot be removed until a critical event element is no longer determined by controller 320. For, example, PMU 312 may be continuously updating an operating condition and determining if operating condition is outside of a predetermined threshold. In one or more embodiments, lockout flag may include an alert on a graphic user interface of, for example, a remote computing device, such as a mobile device, tablet, laptop, desktop and the like. In other embodiments, lockout flag may be indicated to a user via an illuminated LED that is remote or locally located on the battery pack. In one or more embodiments, PMU 312 may include control of cell group balancing via MMUs, control of contactors (high voltage connections, etc.) control of welding detection, control of pyro fuses, and the like.

In one or more embodiments, battery management component 300 may include a plurality of PMUs 312. For instance, and without limitation, battery management component 300 may include a pair of PMUs. For example, and without limitation, battery management component 300 may include a first PMU 312a and a second PMU 312b, which are each disposed in or on the battery pack of power source 116 and may be physically isolated from each other. "Physical isolation", for the purposes of this disclosure, refer to a first system's components, communicative connection, and any other constituent parts, whether software or hardware, are separated from a second system's components, communicative coupling, and any other constituent parts, whether software or hardware, respectively. Continuing in reference to the nonlimiting exemplary embodiment, first PMU 312a and second PMU 312b may perform the same or different functions. For example, and without limitation, the first and second PMUs 312a,b may perform the same, and therefore, redundant functions. Thus, if one PMU 312a/b fails or malfunctions, in whole or in part, the other PMU 312b/a may still be operating properly and therefore battery management component 300 may still operate and function properly for the battery pack. One of ordinary skill in the art would understand that the terms "first" and "second" do not refer to either PMU as primary or secondary. In non-limiting embodiments, the first and second PMUs 312a,b, due to their physical isolation, may be configured to withstand malfunctions or failures in the other system and survive and operate. Provisions may be made to shield first PMU 312a from PMU 312b other than physical location, such as structures and circuit fuses. In non-limiting embodiments, first PMU 312a, second PMU 312b, or subcomponents thereof may be disposed on an internal component or set of components within the battery pack, such as on battery module sense board, as discussed further below in this disclosure.

Still referring to FIG. 3, first PMU 312a may be electrically isolated from second PMU 312b. "Electrical isolation", for the purposes of this disclosure, refer to a first system's separation of components carrying electrical signals or electrical energy from a second system's components. First PMU 312a may suffer an electrical catastrophe, rendering it inoperable, and due to electrical isolation, second PMU 312b may still continue to operate and function normally, allowing for continued management of the battery pack of electric aircraft 204. Shielding such as structural components, material selection, a combination thereof, or another undisclosed method of electrical isolation and insulation may be used, in nonlimiting embodiments. For example, and without limitation, a rubber or other electrically insulating material component may be disposed between electrical components of first and second PMUs 312a,b, preventing electrical energy to be conducted through it, isolating the first and second PMUs 312a,b form each other.

With continued reference to FIG. 3, battery management component 300 may include memory component 324, as previously mentioned above in this disclosure. In one or more embodiments, memory component 324 may be configured to store datum related to the battery pack, such as data related to battery modules 208a-n and/or battery cells 212. For example, and without limitation, memory component 324 may store sensor datum, measurement datum, operation condition, critical event element, lockout flag, and the like. Memory component 324 may include a database. Memory component 324 may include a solid-state memory or tape hard drive. Memory component 324 may be communicatively connected to PMU 312 and may be configured to receive electrical signals related to physical or electrical phenomenon measured and store those electrical signals as battery module data. Alternatively, memory component 324 may be a plurality of discrete memory components that are physically and electrically isolated from each other. One of ordinary skill in the art would understand the virtually limitless arrangements of data stores with which battery pack of power source 116 could employ to store battery pack data.

Figure 4:
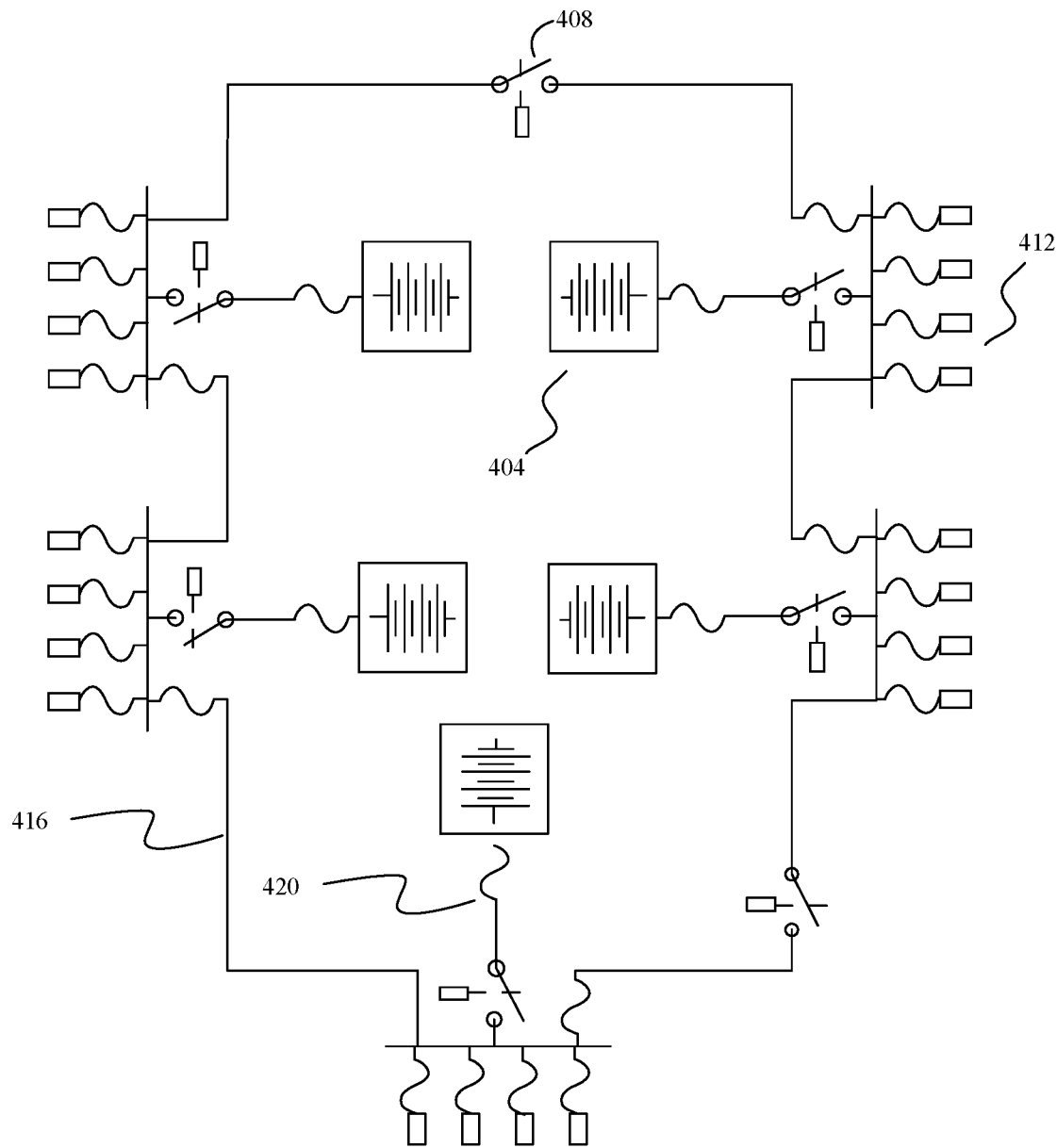
FIG. 4 is a schematic diagram an exemplary embodiment of a bus element with energy storage elements connected thereto.

Referring now to FIG. 4, exemplary embodiment of system 400 is represented in schematic form. System 400 may include a first energy storage element 404. In a non-limiting embodiment, first storage element 404 may be consistent with electrical device 108. First energy storage element 404 may be consistent with any energy storage element as described in this disclosure. For example, and without limitation, first energy storage element 404 may include a plurality of battery packs, battery modules, battery cells, or other types of energy storage elements electrically connected together in series and/or parallel. One of ordinary skill in the art would appreciate that there are five energy storage elements illustrated in FIG. 4, however, any number of energy storage elements may be included in system and operate according to the herein described methodology. For example, and without limitation, first energy storage element 404 and any of the plurality of energy storage elements illustrated or described may include portions of larger energy storage elements such as five battery modules housed within one battery pack. For example, and without limitation, first energy storage element 404 may include more than one battery modules housed within one battery pack, a second energy storage element may include a single battery module housed within the same battery pack, and a third energy storage element may include an entire battery pack. One of ordinary skill in the art will appreciate the vast arrangements of energy storage elements and the respective capacities thereof.

With continued reference to FIG. 4, exemplary embodiment of system 400 may include a bus element 408. Bus element 408 may be consistent with any bus element as described in this disclosure. In a non-limiting embodiment, bus element 408 may be consistent with the laminated bus of electrical bridging device 104. Alternatively or additionally, electrical bridging device 104 may include bus element 408. Bus element 408 may be any manner of conductive material configured to convey electrical energy in any form as described in this disclosure between components. For example, and without limitation, bus element 408 may include any number of components electrically connected thereto, including circuit elements, energy storage elements, propulsors, flight control components, one or more computing devices, sensors, or combination thereof, among others. Bus element 408 may include a plurality of wires or conductive strips, bars, structures, or a combination thereof. Bus element 408 may be configured to convey electrical energy configured to power one or more other components electrically connected thereto and/or be configured to convey electrical energy configured to transmit signals between one or more components.

With continued reference to FIG. 4, exemplary embodiment of system 400 include a cross tie element 412. Cross tie element 412 may be consistent with any cross tie element as described in this disclosure. Cross tie element 412 may include any electrical switches, relays, components, or combinations thereof. Cross tie element 412 may be electrically connected to bus element 408 and through said bus element 408 may be electrically and communicatively connected to any one or more components as described in this disclosure, namely any of the plurality of energy storage elements such as first energy storage element 404. Cross tie element 412 may be configured to receive one or more electrical signals configured to open or close cross tie element 412. Cross tie element 412, through said opening and closing may electrically disconnect or connect, respectively, first energy storage element from second energy storage element or plurality of energy storage elements as described in this disclosure.

With continued reference to FIG. 4, exemplary embodiment of system 400 may include a propulsor 416. Propulsor 416 may be electrically and communicatively connected to any of the plurality of other components as described in this disclosure through bus element 408. Propulsor 416 may be one of a plurality of propulsors as described in this disclosure. For example, and without limitation, propulsor 416 may include an electric motor, an actuator consistent with any actuator as described in this disclosure, one or more computing devices, or any other propulsor configured to manipulate a fluid medium.

With continued reference to FIG. 4, exemplary embodiment of system 400 may include a fuse 420. Fuse 420 may be consistent with any fuse as described in this disclosure. In general, and for the purposes of this disclosure, a fuse is an electrical safety device that operate to provide overcurrent protection of an electrical circuit. As a sacrificial device, its essential component may be metal wire or strip that melts when too much current flows through it, thereby interrupting energy flow. Fuse 420 may include a thermal fuse, mechanical fuse, blade fuse, expulsion fuse, spark gap surge arrestor, varistor, or a combination thereof. Fuse 420 may be implemented in any number of arrangements and at any point or points within exemplary embodiment of system 400. Fuse 420 may be included between plurality of energy storage elements, propulsors, cross tie elements, or any other component electrically connected to bus element 408. Fuse 420 may be implemented between any other electrical components connected anywhere or in any system comprised by the herein disclosed embodiments.

Figure 5A:
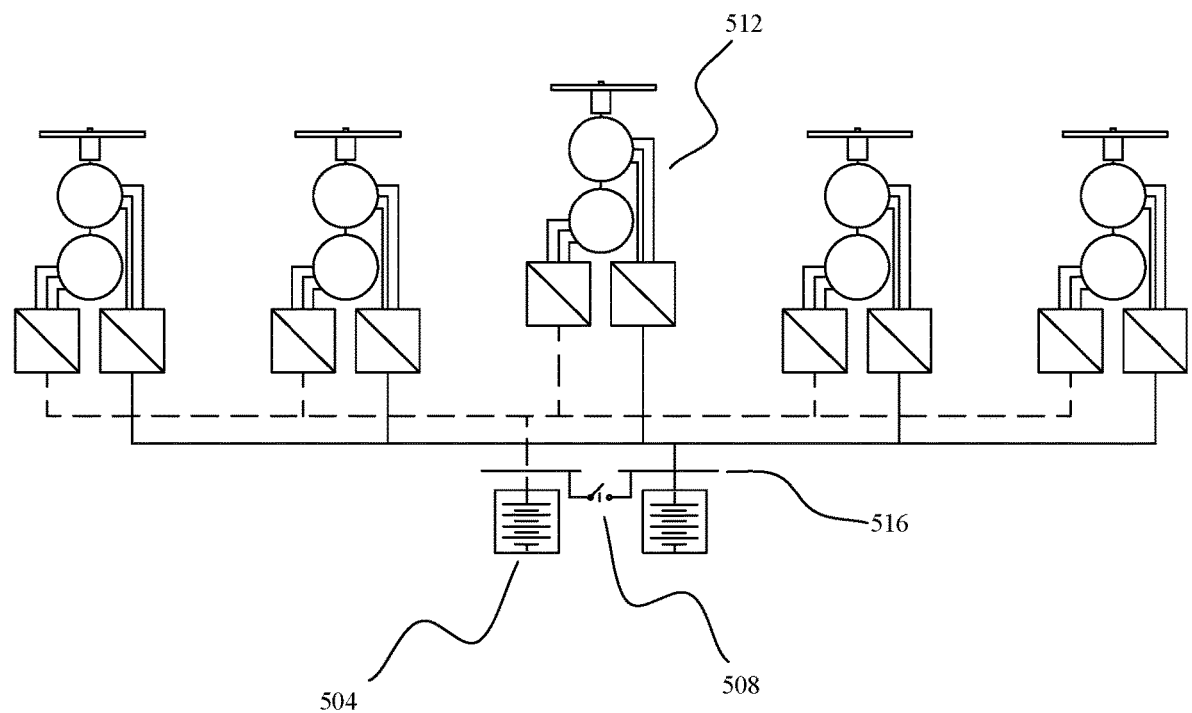
FIG. 5A is a schematic diagram of an exemplary embodiment of a system for dynamic excitation of an energy storage element configured for use in an electric aircraft.

Referring now to FIG. 5A, a schematic diagram of an exemplary embodiment of system 500 is presented. System 500 includes first energy storage element 504. First energy storage element 504 may be consistent with any energy storage element as described in this disclosure. For example, and without limitation, first energy storage element 504 may include a plurality of battery packs, battery modules, battery cells, or other types of energy storage elements electrically connected together in series and/or parallel. One of ordinary skill in the art would appreciate that there are two energy storage elements illustrated in FIG. 5A, however, any number of energy storage elements may be included in system and operate according to the herein described methodology.

With continued reference to FIG. 5A, exemplary embodiment of system 500 may include bus element 508. Bus element 508 may be consistent with any bus element as described in this disclosure. Bus element 508 may include any manner of conductive material configured to convey electrical energy in any form as described in this disclosure between components. For example, and without limitation, bus element 508 may include any number of components electrically connected thereto, including circuit elements, energy storage elements, propulsors, flight control components, one or more computing devices, sensors, or combination thereof, among others. Bus element 508 may include a plurality of wires and/or conductive strips, bars, structures, or a combination thereof. Bus element 508 may be configured to convey electrical energy configured to power one or more other components electrically connected thereto and/or be configured to convey electrical energy configured to transmit signals between one or more components.

With continued reference to FIG. 5A, exemplary embodiment of system 500 may include a cross tie element 512. Cross tie element 512 may be consistent with any cross tie element as described in this disclosure. Cross tie element 512 may include any electrical switches, relays, components, or combinations thereof. Cross tie element 512 may be electrically connected to bus element 508 and through said bus element 508 may be electrically and communicatively connected to any one or more components as described in this disclosure, namely any of the plurality of energy storage elements such as first energy storage element 504. Cross tie element 512 may be configured to receive one or more electrical signals configured to open or close cross tie element 512. Cross tie element 512, through said opening and closing may electrically disconnect or connect, respectively, first energy storage element from second energy storage element or plurality of energy storage elements as described in this disclosure.

With continued reference to FIG. 5A, exemplary embodiment of system 500 may include a propulsor 516. Propulsor 516 may be electrically and communicatively connected to any of the plurality of other components as described in this disclosure through bus element 508. Propulsor 516 may be one of a plurality of propulsors as described in this disclosure. For example, and without limitation, propulsor 516 may include an electric motor, an actuator consistent with any actuator as described in this disclosure, one or more computing devices, or any other propulsor configured to manipulate a fluid medium.

Figure 5B:
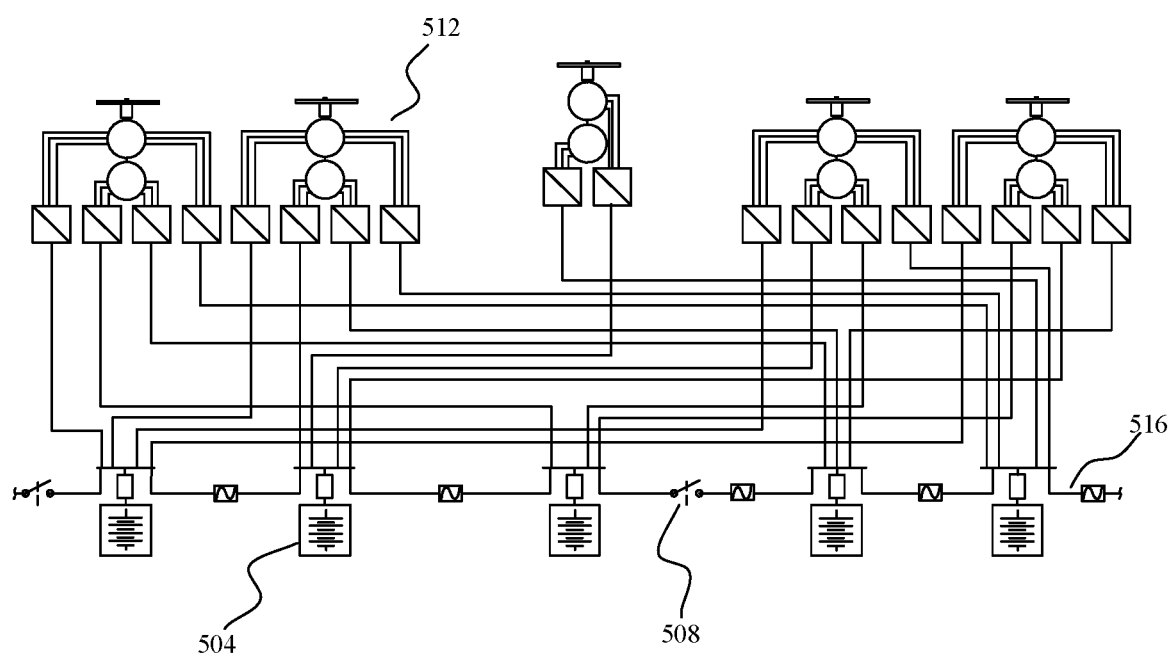
FIG. 5B is a schematic diagram of an exemplary embodiment of a system for dynamic excitation of an energy storage element configured for use in an electric aircraft.

Referring now to FIG. 5B, a schematic diagram of another exemplary embodiment of system 500 is presented in schematic form. System 500 may include a first energy storage element 504. First energy storage element 504 may be consistent with any energy storage element as described in this disclosure. For example, and without limitation, first energy storage element 504 may include a plurality of battery packs, battery modules, battery cells, or other types of energy storage elements electrically connected together in series and/or parallel. One of ordinary skill in the art would appreciate that there are five energy storage elements illustrated in FIG. 5A, however, any number of energy storage elements may be included in system and operate according to the herein described methodology. For example, and without limitation, first energy storage element 504 and any of the plurality of energy storage elements illustrated or described may include portions of larger energy storage elements such as five battery modules housed within one battery pack. For example, and without limitation, first energy storage element 504 may include more than one battery modules housed within one battery pack, a second energy storage element may include a single battery module housed within the same battery pack, and a third energy storage element may include an entire battery pack. One of ordinary skill in the art will appreciate the vast arrangements of energy storage elements and the respective capacities thereof.

With continued reference to FIG. 5B, exemplary embodiment of system 500 may include a bus element 508. Bus element 508 may be consistent with any bus element as described in this disclosure. Bus element 508 may be any manner of conductive material configured to convey electrical energy in any form as described in this disclosure between components. For example, and without limitation, bus element 508 may include any number of components electrically connected thereto, including circuit elements, energy storage elements, propulsors, flight control components, one or more computing devices, sensors, or combination thereof, among others. Bus element 508 may include a plurality of wires or conductive strips, bars, structures, or a combination thereof. Bus element 508 may be configured to convey electrical energy configured to power one or more other components electrically connected thereto and/or be configured to convey electrical energy configured to transmit signals between one or more components.

With continued reference to FIG. 5B, exemplary embodiment of system 500 may include a cross tie element 512. Cross tie element 512 may be consistent with any cross tie element as described in this disclosure. Cross tie element 512 may include any electrical switches, relays, components, or combinations thereof. Cross tie element 512 may be electrically connected to bus element 508 and through said bus element 508 may be electrically and communicatively connected to any one or more components as described in this disclosure, namely any of the plurality of energy storage elements such as first energy storage element 504. Cross tie element 512 may be configured to receive one or more electrical signals configured to open or close cross tie element 512. Cross tie element 512, through said opening and closing may electrically disconnect or connect, respectively, first energy storage element from second energy storage element or plurality of energy storage elements as described in this disclosure.

With continued reference to FIG. 5B, exemplary embodiment of system 500 may include a propulsor 516. Propulsor 516 may be electrically and communicatively connected to any of the plurality of other components as described in this disclosure through bus element 508. Propulsor 516 may be one of a plurality of propulsors as described in this disclosure. For example, and without limitation, propulsor 516 may include an electric motor, an actuator consistent with any actuator as described in this disclosure, one or more computing devices, or any other propulsor configured to manipulate a fluid medium.

With continued reference to FIG. 5B, exemplary embodiment of system 500 may include a fuse 520. Fuse 520 may be consistent with any fuse as described in this disclosure. In general, and for the purposes of this disclosure, a fuse is an electrical safety device that operate to provide overcurrent protection of an electrical circuit. As a sacrificial device, its essential component may be metal wire or strip that melts when too much current flows through it, thereby interrupting energy flow. Fuse 520 may include a thermal fuse, mechanical fuse, blade fuse, expulsion fuse, spark gap surge arrestor, varistor, or a combination thereof. Fuse 520 may be implemented in any number of arrangements and at any point or points within exemplary embodiment of system 500. Fuse 520 may be included between plurality of energy storage elements, propulsors, cross tie elements, or any other component electrically connected to bus element 508. Fuse 520 may be implemented between any other electrical components connected anywhere or in any system comprised by the herein disclosed embodiments.

Figure 6:
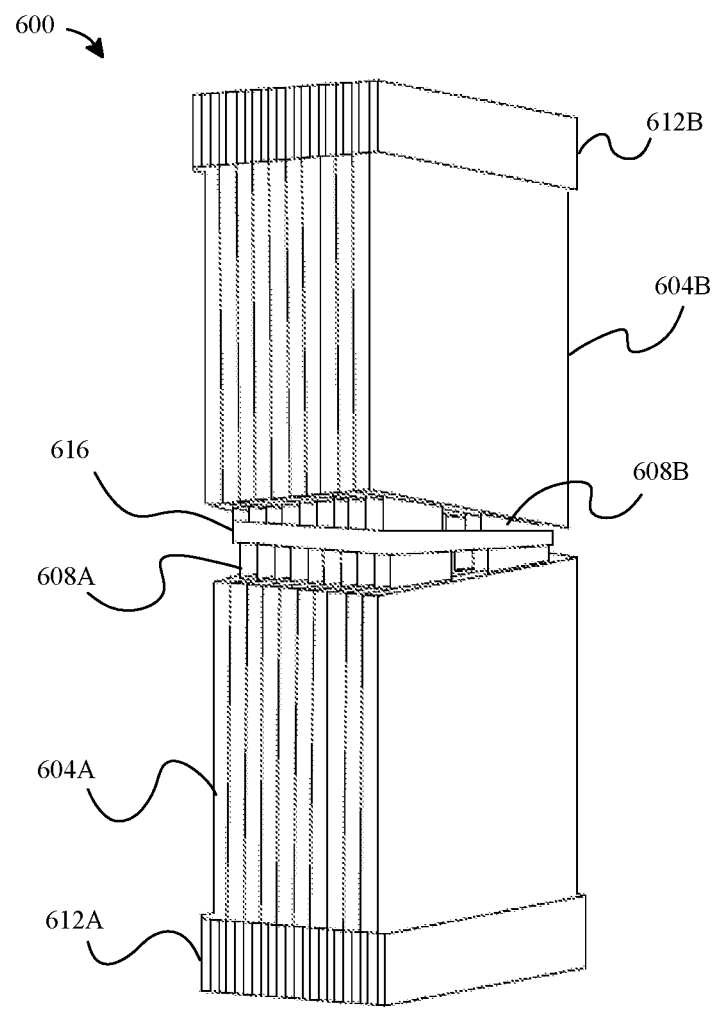
FIG. 6 is an illustration of an exemplary embodiment of an assembly electrical devices.

Referring now to FIG. 6, an exemplary embodiment of a battery assembly 600 is shown. A "battery assembly" as used in this disclosure is a structure containing a plurality of battery packs. In a non-limiting embodiment, battery assembly 600 may include an assembly of electrical devices 108, wherein the electrical devices may include battery packs. Battery assembly 600 may include battery packs 604A-B. Battery packs 604A-B may include a plurality of battery cells. In some embodiments, a plurality of battery cells may include lithium-ion battery cells. In some embodiments, battery packs 604A-B may include battery cell retainer 612A-B. In some embodiments, battery packs 604A-B may include pair of conductive foil tabs 608A-B. In some embodiments, battery assembly 600 may include electrical bridging device 616. Electrical bridging device 616 may be consistent with electrical bridging device 104

Still referring to FIG. 6, electrical bridging device 616 may be configured to carry an electrical current from battery pack 604A to battery pack 604B. In some embodiments, electrical bridging device 616 may be configured to carry an electrical current from battery pack 604B to battery pack 604A. In some embodiments, electrical bridging device 616 may be configured to connect to another electrical component external to battery assembly 600. In some embodiments, battery assembly 600 may include a plurality of electrical bridging devices 616. In some embodiments, battery packs 604A-B may be configured to house electrical bridging device 616. In other embodiments, electrical bridging device 616 may be configured to connect to a side of battery pack 604A-B. In some embodiments, electrical bridging device 616 may be configured to couple to a first side of battery packs 604A-B. A "first side" as used in this disclosure, is an initial contact point between an electrical bridging device and a battery pack. In some embodiments, electrical bridging device 616 may be configured to couple to a second side of battery packs 604A-B. A "second side" as used in this disclosure is a surface opposite a first contact point of an electrical bridging device and a battery pack. In some embodiments, a plurality of electrical bridging devices may connect each individual battery cell of battery pack 604A to each individual battery cell of battery pack 604B. In some embodiments, electrical bridging device may be configured to connect each tab of conductive in some embodiments, electrical bridging device 616 may be configured to provide an "electrical joint" at various points along battery assembly 600. An "electrical joint" as used in this disclosure, is a point in a circuit in which current and/or voltage may be shared with an external electrical component. In some embodiments, an electrical joint may include a power distribution component. A power distribution component may include a component in electrical communication with electrical bridging device 616 that may allow for further external connections to other electrical components. An external electrical component may include a busbar, a circuit, a ground terminal, or other electrical components. In a non-limiting example, a power distribution component may be placed on a top side of electrical bridging device 616. A power distribution unit may be configured to provide an external electrical communication from a top side of electrical bridging device 616. In other embodiments, a power distribution unit may be configured to provide an external electrical communication from a rear, bottom, left, and/or right side of electrical bridging device 616. In some embodiments, electrical bridging device 616 may include a coating. A coating may be configured to allow a greater ampacity of electrical bridging device 616. An "ampacity" may include a maximum current carrying capacity of electrical bridging device 616. Ampacity may be measured in amps. In some embodiments, a coating may include tin, silver, copper, and/or other coating elements.

In some embodiments, and with continued reference to FIG. 6, electrical bridging device 616 may be configured to electrically connect conductive foil tabs 608A to conductive foil tabs 608B. Electrical bridging device 616 may connect battery pack 604A to battery pack 604B in a series and/or parallel connection. In some embodiments, electrical bridging device 616 may connect a plurality of battery packs in a plurality of series connections, parallel connections, and/or combination thereof. In some embodiments, electrical bridging device 616 may be configured to connect a plurality of conductive foil tabs together. In some embodiments, electrical bridging device 616 may surround each tab of conductive foil tabs 608A-B.

In some embodiments, and with continued reference to FIG. 6, electrical bridging device 616 may include a cooling element. A "cooling element" as used in this disclosure, is an element that aids in a reduction of a thermal energy of a battery pack. A thermal energy may include a heat that may be measured in Fahrenheit (° F.), Celsius (° C.), or Kelvin (° K). In some embodiments, a cooling element may include a venting system. A venting system may include a fan that may be configured to allow a flow of air. In some embodiments, a venting system may include a plurality of fans. In some embodiments, a venting system may include a structured pathway that may be configured to passively direct heat away from battery assembly 600. In other embodiments, a cooling element may include a liquid cooling system. A liquid cooling system may include a pathway configured to allow a liquid to flow through the pathway. A liquid may include, but is not limited to, water, ethylene glycol, propylene glycol, mineral water, and/or other liquids. A liquid cooling system may be configured to direct a flow of liquid through electrical bridging device 616 that may allow for a reduction in temperature of electrical bridging device 616. In other embodiments, a liquid cooling system may be configured to allow a liquid to flow throughout battery assembly 600 in a structured pathway. In some embodiments, a cooling element may include a heat sink. In other embodiments, a cooling element may include a thermal paste. Electrical bridging device 616 may be configured to cool battery assembly 600. In some embodiments, electrical bridging device 616 may be configured to include a plurality of holes. A plurality of holes may assist in a venting and/or cooling of battery assembly 600. In other embodiments, a plurality of holes may be configured to hold a cold plate. A cold plate may include a plate configured to transfer a heat away from electrical bridging device 616 and to a fluid. In some embodiments, electrical bridging device 616 may include a layered structure that may include a water cooling system sandwiched between a plurality of layers. In a non-limiting example, electrical bridging device 616 may include a serpentine like structure of interior liquid cooling pathways surrounded by a conductive exterior element. In other embodiments, a structure of an interior liquid cooling pathway may include a rectangular, square, triangular, circular, or other structure. In some embodiments, electrical bridging device 616 may include one or more cooling vanes. A "cooling vane" as used in this disclosure is a thin conductive element that is configured to direct heat away from a heat source. In some embodiments, a cooling vane may be configured to extend to a surface area of electrical bridging device 616. In some embodiments, a cooling vane may be configured to be utilized with air cooling and/or radiative cooling systems. In some embodiments, electrical bridging device 616 may include one or more heat pipes. A "heat pipe" as used in this disclosure is a heat transfer device that combines thermal conductivity and phase transition to transfer heat between two solid interfaces. In some embodiments, a heat pipe may include a liquid that may be in contact with a thermally conductive solid. A liquid may turn into vapor by absorbing heat from a thermally conductive solid. A vapor may travel along a heat pipe to a cold interface. A cold interface may be configured to condenses a vapor into a liquid which may release latent heat of the vapor. A liquid may return to a hot interface by a number of means, such as, but not limited, capillary action, centrifugal force, and/or gravity.

Still referring to FIG. 6, in some embodiments electrical bridging device 616 may be configured to prevent a current overload of battery assembly 600. A "current overload" may include a current excessive relative to a normal operating current. A current overload may damage electrical components of battery assembly 600. In some embodiments, electrical bridging device 616 may be configured to include a shunt. A "shunt" as used in this disclosure is an electrical component that creates a low resistance path for electric current to allow the current to pass around another point in a circuit. In some embodiments, electrical bridging device 616 may include a plurality of shunts. In some embodiments, electrical bridging device 616 may include a fuse and/or circuit breaker. Electrical bridging device 616 may include a sensor. In some embodiments, electrical bridging device 616 may include a plurality of sensors. A sensor may include but is not limited to, a temperature, voltage, current, pressure, humidity, or other sensor. A sensor of electrical bridging device 616 may be configured to determine a maximum temperature threshold of battery packs 604A-B. In a non-limiting example, electrical bridging device 616 may detect a temperature about a maximum temperature threshold of battery pack 604A. Electrical bridging device 616 may disconnect battery pack 604A from battery pack 604B in order to prevent further overheating. In some embodiments, electrical bridging device 616 may be configured to include a connection mechanism. A connection mechanism may include an electromechanical switch. Electrical bridging device 616 may utilize an electromechanical switch to disconnect itself from battery pack 604A-B.

Still referring to FIG. 6, electrical bridging device 616 may include a controller area network bus. A "controller area network bus," as used in this disclosure, is vehicle bus unit including a central processing unit (CPU), a CAN controller, and a transceiver designed to allow devices to communicate with each other's applications without the need of a host computer. A controller area network (CAN) bus unit may include physical circuit elements that may use, for instance and without limitation, twisted pair, digital circuit elements/FGPA, microcontroller, or the like to perform, without limitation, processing and/or signal transmission processes and/or tasks; circuit elements may be used to implement CAN bus components and/or constituent parts as described in further detail below. A CAN bus unit may include multiplex electrical wiring for transmission of multiplexed signaling. A CAN bus unit may include message-based protocol(s), wherein the invoking program sends a message to a process and relies on that process and its supporting infrastructure to then select and run appropriate programing. A plurality of CAN bus units may be located at electrical bridging device 616.

Still referring to FIG. 6, electrical bridging device 616 may include a plurality of controller area network gateways communicatively connected to a plurality of physical controller area network buses, wherein the plurality of controller area network gateways are configured to transmit a plurality of data. A "controller area network gateway," as used in this disclosure, is a piece of networking hardware used for transmission of data signals from one discrete network to another. A CAN gateway may include routers and/or switches which may provide interoperability between physical CAN bus units communicatively connected with switches, such as Ethernet switches, wherein the intraoperatively may include the transmission of data between battery assembly 600 and the Ethernet switch. A CAN gateway may include internet protocol (IP) network gateways, internet-to-orbit gateways, cloud storage gateways, internet-of-things (IoT) gateways, network switch, among other devices.

Continuing in reference to FIG. 6, battery assembly 600 may include at least a network switch communicatively connected to the plurality of controller area network gateways configured to receive the transmitted measured state data and transmit the measured state data via a transmission signal. A "network switch," as used in this disclosure, is a networking hardware that connects devices on a computer network using packet switching to receive and forward data to a destination device. A network switch may include an Ethernet hub switch, which may be used for Fiber Channel, Asynchronous Transfer Modes, and/or InfiniBand. A "transmission signal," as used in this disclosure, is a transmitted analogue and/or digital signal originated from a physical CAN bus unit. A transmission signal may include data.

Continuing in reference to FIG. 6, a transmission signal may include Ethernet transmission signal. An "Ethernet transmission signal," as used in this disclosure, is an analogue and/or digital signal transmitted using functionality of the Ethernet family of computer network standards. An ethernet transmission signal may be generated by and/or from a network switch, wherein signals received by the network switch from a CAN gateway may be transmitted as an Ethernet transmission signal from the network switch; transmission may include multiplexing, for instance and without limitation by way of a multiplexor, and/or selection by some logic at a network switch. A network switch may include a physical layer defining the electrical and/or optical properties of the physical connection between a device, such as a CAN gateway, and a network. A transmission signal of data originating from a physical CAN bus unit may be transmitted to a virtual CAN bus, and/or virtual CAN bus unit, as described in further detail below, as an Ethernet-transmissible signal. Data may be signaled to a virtual bus via a wireless, wired, optical, or other connection, and/or an Ethernet connection; virtual bus unit may correspondingly transmit back to a physical CAN bus unit back through a network switch using any such media of transmission. Transmitting back may include, for instance and without limitation, transmitting a control message to remotely alter a state of aircraft, as described in further detail below.

Continuing in reference to FIG. 6, transmission signal may include radio frequency transmission signal. A "radio frequency transmission signal," as used in this disclosure, is an alternating electric current or voltage or of a magnetic, electric, or electromagnetic field or mechanical system in the frequency range from approximately 20 kHz to approximately 300 GHz. A radio frequency (RF) transmission signal may compose analogue and/or digital signal received, from instance via a network gateway and transmitted using functionality of output power of radio frequency from a transmitter to an antenna, and/or any RF receiver. A RF transmission signal may use longwave transmitter device for transmission of signals. A RF transmission signal may include a variety of frequency ranges, wavelength ranges, ITU designations, and IEEE bands including HF, VHF, UHF, L, S, C, X, Ku, K, Ka, V, W, mm, among others. A radio frequency transmission signal may be generated by and/or from a network switch. Signals received by a network switch from a CAN gateway may be transmitted, for instance and without limitation as multiplexed by way of a multiplexor and/or selected by some logic at the network switch, as a radio frequency transmission signal from the network switch. A network switch may include a physical layer defining electrical and/or optical properties of a physical connection between a device, such as a CAN gateway, and a communication device such as without limitation a radiating antenna used to convert a time-varying electric current into an electromagnetic wave or field. In a non-limiting example, transmission signal of measured state data originating from a physical CAN bus unit may be transmitted to a virtual CAN bus, and/or virtual CAN bus unit, as a radio wave-transmissible signal. Data may be signaled to a virtual bus via a transmitting antenna and/or encoder and received by a receiving antenna and/or receiver at bus unit; transmission may be relayed by one or more intervening devices such as network hubs and/or nodes, satellites, or the like. A radio frequency signal transmission may be sent to a virtual bus unit and the virtual bus unit may correspondingly transmit back to a physical CAN bus unit through a network switch. Transmitting back may include, for instance and without limitation, transmitting a control message to remotely alter a state of an aircraft, as described in further detail below.

Continuing in reference to FIG. 6, a network switch may be further configured to multiplex the plurality of measured state data 108 messages from a plurality of physical CAN bus units into a single incoming transmission signal. A "single incoming transmission signal," as used in this disclosure, is a multiplexed transmission signal including a plurality of data transmission signals originating from a plurality of physical CAN bus units. A single transmission signal may include a plurality of Ethernet transmission signals from a plurality of network gateways. A single transmission signal may include a plurality of RF transmission signals from a plurality of network gateways. Multiplexing may include any method by which multiple analogue and/or digital signals are combined into one signal over a shared medium. For instance and without limitation, multiplexing may include receiving a plurality of inputs and choosing, or selecting, which input to send as an output from a multiplexor based on control inputs to the multiplexor. Multiplexing may include analogue modulation, such as amplitude modulation (AM), frequency modulation (FM), phase modulation (PM), quadrature amplitude modulation (QAM), space modulation (SM), single-sideband modulation (SSB), and the like. Multiplexing may include circuit mode modulation, including time-division multiplexing (TDM), frequency-division multiplexing (FDM), wavelength-division multiplexing (WDM), space-division multiple access (SDMA), polarization-division multiplexing (PDM), spatial multiplexing, and the like. Multiplexing may include statistical multiplexing, including packet switching, dynamic time-division multiple access (TDMA), frequency-hopping spread spectrum (FHSS), and the like. Multiplexing may be performed by a multiplexer such as any programmable logic device which selects between several analog and/or digital input signals and forwards the selected inputs to a single output line. A network switch may include multiplexor and/or may act as a multiplexer for receiving, for instance and without limitation, multiple Ethernet-based transmission signals and package the transmission into a single output to transmit via Ethernet transmission to a virtual CAN bus.

Continuing in reference to FIG. 6, battery assembly 600 may include a virtual controller area network bus unit configured to receive the transmission signal originating from the at least a network switch. A "virtual controller area network bus unit," as used in this disclosure, is a device including a central processing unit (CPU), CAN controller, and transceiver, which receives a transmission signal and virtually recapitulate the status, behavior, and/or data of and/or originating from a physical CAN bus unit. A virtual CAN bus unit may include any physical circuit elements suitable for use in physical CAN bus unit as described above. A virtual CAN bus unit may include a multiplexor, multiplexing logic, and/or multiplex electrical wiring for transmission of multiplexed signaling to a network switch. A virtual CAN bus unit may include message-based protocol(s), wherein the invoking program sends a message to a process and relies on that process and its supporting infrastructure to then select and run appropriate programing. A virtual CAN bus unit may include a computing device, as described in further detail below. A virtual CAN bus unit may include a computer, "smartphone", IoT device, tablet computer, among other devices with capability described herein. Virtual CAN bus unit 132 may receive a transmission signal including data. A virtual CAN bus unit may receive a transmission signal as an Ethernet transmission signal and/or RF transmission signal. A virtual CAN bus unit may include a virtual machine, which operates as an emulation of a computer system, providing functionality of a physical computer. A virtual CAN bus unit may include any device herein configured to demultiplex signal, store to disc, transmit signals to other device, and/or send back to flight CAN(s).

Continuing in reference to FIG. 6, a virtual CAN bus unit may be configured to demultiplex a single incoming transmission signal into a plurality of outgoing messages originating from the plurality of physical controller area network buses. An "outgoing message," as used in this disclosure, is a demultiplexed transmission signal which originated as part of the single incoming transmission signal. Outgoing message may include a plurality of data, and/or discrete portions thereof. An outgoing message may include analogue and/or digital transmission signals, including an Ethernet transmission signal and/or RF transmission signal. Demultiplexing is a process of reconverting a single transmission signal containing the multiple analogue and/or digital signal streams from a plurality of network gateways back into the original separate and unrelated signals originally relayed from physical CAN bus units. Demultiplexing may include extracting the original channels on the receiving end to identify which physical CAN bus unit a signal originates from. Demultiplexing may be performed using a demultiplexer such as a binary decoder, or any programmable logic device. Demultiplexing may be performed using a computing software operating on a virtual CAN bus unit, which may deconvolute a single transmission signal. Alternatively or additionally, a virtual CAN bus unit may be configured to communicatively connect to each controller area network gateway of the plurality of controller area network gateways. A virtual CAN bus unit may receive signal transduction directly from CAN network gateways, circumventing the need for multiplexing.

Continuing in reference to FIG. 6, a virtual CAN bus unit may be configured to bridge a plurality of virtual controller area network bus units to the plurality of physical controller area network bus units. A "plurality of virtual controller area network bus units," as used in this disclosure, is at least a second virtual CAN bus unit aside from a first virtual CAN bus unit which originally received a single transmission signal. A plurality of virtual controller area network bus units may include any capability as described for a virtual CAN bus unit herein. A network bridge may include a computer networking device that creates a single, aggregate network from multiple communication networks or network segments. Network bridging is distinct from routing. Routing may allow multiple networks to communicate independently and yet remain separate, whereas bridging may connect two separate networks as if they were a single network. In this way, a virtual CAN bus unit may transmit the demultiplexed outgoing messages to a plurality of virtual CAN bus units which may operate as if they were all part of the same virtual machine. Bridging may include any type of network bridging technology, such as simple bridging, multiport bridging, and learning or transparent bridging. A virtual CAN bus unit may perform bridging using a forwarding information base stored in content-addressable memory (CAM), wherein for each received ethernet frame, a virtual CAN bus unit may learn from the frame's source MAC address and add this together with an interface identifier to the forwarding information base. A virtual CAN bus unit may then forward the frame to the interface found in the CAM based on the frame's destination MAC address. If the destination address is unknown the switch sends the frame out on all interfaces (except the ingress interface). This process is oftentimes referred to unicast flooding. Once a bridge learns the addresses of its connected nodes, it may forward data link layer frames using a layer-2 forwarding method. There are several forwarding methods a bridge can use, for instance and without limitation, store and forward, cut through, fragment free, and adaptive switching, of which some methods are performance-increasing methods when used on "switch" products with the same input and output port bandwidths.

Continuing in reference to FIG. 6, bridging may include using any device that is capable for communicating with a virtual CAN bus unit, computing device, or able to receive data, retrieve data, store data, and/or transmit data, for instance via a data network technology such as 3G, 6G/LTE, 6G, Wi-Fi, IEEE 802.11 family standards, IEEE 802.1aq standards, and the like. For instance and without limitation, Shortest Path Bridging (SPB), specified in the IEEE 802.1aq standard, is a computer networking technology intended to simplify the creation and configuration of networks, while enabling multipath routing. It may include a proposed replacement for Spanning Tree Protocol (SPB) which blocks any redundant paths that could result in a layer 2 loop. SPB may allow all paths to be active with multiple equal-cost paths. SPB may also increase the number of VLANs allowed on a layer-2 network. Bridging between devices may also include devices that communicate using other mobile communication technologies, or any combination thereof, for instance and without limitation, short-range wireless communication for instance, using Bluetooth and/or Bluetooth LE standards, AirDrop, near-field (NFC), and the like. Bridging between devices may be performed using any wired, optical, or wireless electromagnetic transmission medium, as described herein.

Continuing in reference to FIG. 6, bridging a plurality of virtual controller area network bus units to a plurality of physical CAN bus units may include transmitting at least a control message of a plurality of control messages originating from at least a virtual controller network bus of the plurality of virtual controller network buses to a physical CAN bus unit of a plurality of physical CAN bus units. A "control message," as used in this disclosure, is a transmission signal that is intended to control a device that is considered at a physical CAN bus and/or communicated therewith.

Figure 7:
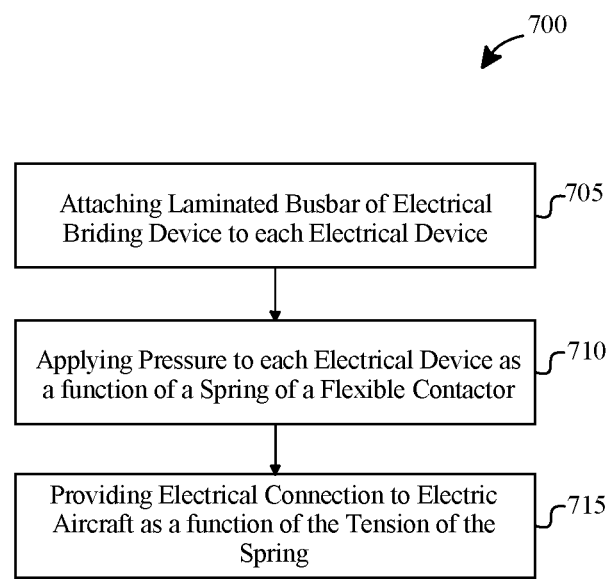
FIG. 7 is a flow diagram of an exemplary embodiment of a method for a laminated buswork with flexible conductors for an electric aircraft.

Referring now to FIG. 7, a flow diagram of an exemplary embodiment of a method 700 for a laminated buswork with flexible conductors for an electric aircraft is presented. Method 700, at step 705, may include attaching a laminated busbar of an electrical bridging device to each electrical device of a plurality of electrical devices as a function of a plurality of flexible contactors. The laminated busbar may be consistent with any laminated busbar as described in the entirety of this disclosure. The electrical bridging device may be consistent with any electrical bridging device as described herein. The electrical device may be consistent with the electrical device as described herein. The flexible contactors may be consistent with any flexible contactor as described herein. In a non-limiting embodiment, method 700 may include using a circuit breaker of a plurality of circuit breakers for each connection, wherein the flexible contactor may be integrated with the circuit breaker.

With continued reference to FIG. 7, method 700, at step 710, may include applying pressuring to each electrical device as a function of at least a spring. The at least a spring may be consistent with any spring as described herein. In a non-limiting embodiment, applying pressure may include tightly coiling the spring and holding the flexible contactor to maintain the attachment to the laminated busbar. In a non-limiting embodiment, the at least a spring may be configured to return to its resting position wherein the at least a spring is fully extended and/or loosely coiled. In another embodiment, the at least a spring may include an extension spring configured to apply pressure to either or both ends of the at least a spring and forming a physical connection and/or link between a portion of the electrical device and a portion of the laminated busbar. The at least a spring may be configured to return to a loosely coiled resting position in the event no contact is made or to be made.

still referring to FIG. 7, method 700, at step 715, may include providing electrical connection to the electric aircraft as a function of the tension of the at least a spring. The electrical connection may be consistent with any electrical connection as described in the entirety of this disclosure. In a non-limiting embodiment, method 700 may include distributing electric power as a function of the electrical connection. In another embodiment, method 700 may include initiating a contact mechanism to connect the components of the system or dissolve connection. The contact mechanism may include any contact mechanism as described herein. In a non-limiting embodiment, method 700 may include generating and/or initiating the contact mechanism as a function of a computing device. The computing device may include any computing device as described herein. In a non-limiting embodiment, method 700 may include generating and/or initiating the contact mechanism as a function of a machine-learning model, wherein the method further comprises training the machine-learning model using a contact training data and an electric device datum as an input. The contact training data may include any contact training data as described herein. The electric device datum may include any electric device datum as described herein. In a non-limiting embodiment, the electric device datum may be generated by a sensor. The sensor may include any sensor as described herein.

Figure 8:
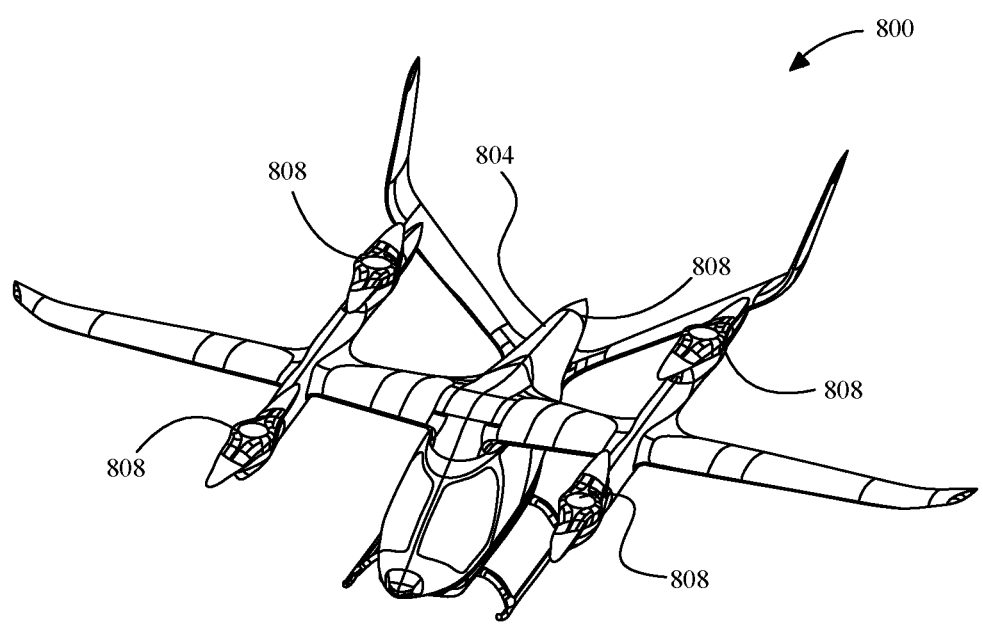
FIG. 8 is an illustration of an exemplary embodiment of an electric aircraft.

Referring now to FIG. 8, an embodiment of an electric aircraft 800 is presented. Electric aircraft 800 may include a vertical takeoff and landing aircraft (eVTOL). As used herein, a vertical take-off and landing (eVTOL) aircraft may be one that can hover, take off, and land vertically. An eVTOL, as used herein, may be an electrically powered aircraft typically using an energy source, of a plurality of energy sources to power the aircraft. In order to optimize the power and energy necessary to propel the aircraft. eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, may be where the aircraft generated lift and propulsion by way of one or more powered rotors connected with an engine, such as a "quad copter," multi-rotor helicopter, or other vehicle that maintains its lift primarily using downward thrusting propulsors. Fixed-wing flight, as described herein, may be where the aircraft may be capable of flight using wings and/or foils that generate life caused by the aircraft's forward airspeed and the shape of the wings and/or foils, such as airplane-style flight. Control forces of the aircraft are achieved by conventional elevators, ailerons and rudders during fixed wing flight. Roll and Pitch control forces on the aircraft are achieved during transition flight by increasing and decreasing torque, and thus thrust on the four lift fans. Increasing torque on both left motors and decreasing torque on both right motors leads to a right roll, for instance. Likewise, increasing the torque on the front motors and decreasing the torque on the rear motors leads to a nose up pitching moment. Clockwise and counterclockwise turning motors torques are increased and decreased to achieve the opposite torque on the overall aircraft about the vertical axis and achieve yaw maneuverability.

With continued reference to FIG. 8, a number of aerodynamic forces may act upon the electric aircraft 800 during flight. Forces acting on an electric aircraft 800 during flight may include, without limitation, thrust, the forward force produced by the rotating element of the electric aircraft 800 and acts parallel to the longitudinal axis. Another force acting upon electric aircraft 800 may be, without limitation, drag, which may be defined as a rearward retarding force which may be caused by disruption of airflow by any protruding surface of the electric aircraft 800 such as, without limitation, the wing, rotor, and fuselage. Drag may oppose thrust and acts rearward parallel to the relative wind. A further force acting upon electric aircraft 800 may include, without limitation, weight, which may include a combined load of the electric aircraft 800 itself, crew, baggage, and/or fuel. Weight may pull electric aircraft 800 downward due to the force of gravity. An additional force acting on electric aircraft 800 may include, without limitation, lift, which may act to oppose the downward force of weight and may be produced by the dynamic effect of air acting on the airfoil and/or downward thrust from the propulsor of the electric aircraft. Lift generated by the airfoil may depend on speed of airflow, density of air, total area of an airfoil and/or segment thereof, and/or an angle of attack between air and the airfoil. For example, and without limitation, electric aircraft 800 are designed to be as lightweight as possible. Reducing the weight of the aircraft and designing to reduce the number of components may be essential to optimize the weight. To save energy, it may be useful to reduce weight of components of an electric aircraft 800, including without limitation propulsors and/or propulsion assemblies. In an embodiment, the motor may eliminate need for many external structural features that otherwise might be needed to join one component to another component. The motor may also increase energy efficiency by enabling a lower physical propulsor profile, reducing drag and/or wind resistance. This may also increase durability by lessening the extent to which drag and/or wind resistance add to forces acting on electric aircraft 800 and/or propulsors.

Referring still to FIG. 8, Aircraft may include at least a vertical propulsor 808 and at least a forward propulsor 804. A forward propulsor may be a propulsor that propels the aircraft in a forward direction. Forward in this context may be not an indication of the propulsor position on the aircraft; one or more propulsors mounted on the front, on the wings, at the rear, etc. A vertical propulsor may be a propulsor that propels the aircraft in an upward direction; one of more vertical propulsors may be mounted on the front, on the wings, at the rear, and/or any suitable location. A propulsor, as used herein, may be a component or device used to propel a craft by exerting force on a fluid medium, which may include a gaseous medium such as air or a liquid medium such as water. At least a vertical propulsor 808 may be a propulsor that generates a substantially downward thrust, tending to propel an aircraft in a vertical direction providing thrust for maneuvers such as without limitation, vertical take-off, vertical landing, hovering, and/or rotor-based flight such as "quadcopter" or similar styles of flight.

With continued reference to FIG. 8, at least a forward propulsor 804 as used in this disclosure may be a propulsor positioned for propelling an aircraft in a "forward" direction; at least a forward propulsor may include one or more propulsors mounted on the front, on the wings, at the rear, or a combination of any such positions. At least a forward propulsor may propel an aircraft forward for fixed-wing and/or "airplane"-style flight, takeoff, and/or landing, and/or may propel the aircraft forward or backward on the ground. At least a vertical propulsor 808 and at least a forward propulsor 804 includes a thrust element. At least a thrust element may include any device or component that converts the mechanical energy of a motor, for instance in the form of rotational motion of a shaft, into thrust in a fluid medium. At least a thrust element may include, without limitation, a device using moving or rotating foils, including without limitation one or more rotors, an airscrew or propeller, a set of airscrews or propellers such as contrarotating propellers, a moving or flapping wing, or the like. At least a thrust element may include without limitation a marine propeller or screw, an impeller, a turbine, a pump-jet, a paddle or paddle-based device, or the like. As another non-limiting example, at least a thrust element may include an eight-bladed pusher propeller, such as an eight-bladed propeller mounted behind the engine to ensure the drive shaft may be in compression. Propulsors may include at least a motor mechanically connected to at least a first propulsor as a source of thrust. A motor may include without limitation, any electric motor, where an electric motor may be a device that converts electrical energy into mechanical energy, for instance by causing a shaft to rotate. At least a motor may be driven by direct current (DC) electric power; for instance, at least a first motor may include a brushed DC at least a first motor, or the like. At least a first motor may be driven by electric power having varying or reversing voltage levels, such as alternating current (AC) power as produced by an alternating current generator and/or inverter, or otherwise varying power, such as produced by a switching power source. At least a first motor may include, without limitation, brushless DC electric motors, permanent magnet synchronous at least a first motor, switched reluctance motors, or induction motors. In addition to inverter and/or a switching power source, a circuit driving at least a first motor may include electronic speed controllers or other components for regulating motor speed, rotation direction, and/or dynamic braking. Persons skilled in the art, upon reviewing the entirety of this disclosure, will be aware of various devices that may be used as at least a thrust element.

With continued reference to FIG. 8, during flight, a number of forces may act upon the electric aircraft. Forces acting on an aircraft 800 during flight may include thrust, the forward force produced by the rotating element of the aircraft 800 and acts parallel to the longitudinal axis. Drag may be defined as a rearward retarding force which may be caused by disruption of airflow by any protruding surface of the aircraft 800 such as, without limitation, the wing, rotor, and fuselage. Drag may oppose thrust and acts rearward parallel to the relative wind. Another force acting on aircraft 800 may include weight, which may include a combined load of the aircraft 800 itself, crew, baggage and fuel. Weight may pull aircraft 800 downward due to the force of gravity. An additional force acting on aircraft 800 may include lift, which may act to oppose the downward force of weight and may be produced by the dynamic effect of air acting on the airfoil and/or downward thrust from at least a propulsor. Lift generated by the airfoil may depends on speed of airflow, density of air, total area of an airfoil and/or segment thereof, and/or an angle of attack between air and the airfoil.

With continued reference to FIG. 8, at least a portion of an electric aircraft may include at least a propulsor. A propulsor, as used herein, may be a component or device used to propel a craft by exerting force on a fluid medium, which may include a gaseous medium such as air or a liquid medium such as water. In an embodiment, when a propulsor twists and pulls air behind it, it will, at the same time, push an aircraft forward with an equal amount of force. The more air pulled behind an aircraft, the greater the force with which the aircraft may be pushed forward. Propulsor may include any device or component that consumes electrical power on demand to propel an electric aircraft in a direction or other vehicle while on ground or in-flight.

With continued reference to FIG. 8, in an embodiment, at least a portion of the aircraft may include a propulsor, the propulsor may include a propeller, a blade, or any combination of the two. The function of a propeller may be to convert rotary motion from an engine or other power source into a swirling slipstream which pushes the propeller forwards or backwards. The propulsor may include a rotating power-driven hub, to which are attached several radial airfoil-section blades such that the whole assembly rotates about a longitudinal axis. The blade pitch of the propellers may, for example, be fixed, manually variable to a few set positions, automatically variable (e.g. a "constant-speed" type), or any combination thereof. In an embodiment, propellers for an aircraft are designed to be fixed to their hub at an angle similar to the thread on a screw makes an angle to the shaft; this angle may be referred to as a pitch or pitch angle which will determine the speed of the forward movement as the blade rotates.

With continued reference to FIG. 8, in an embodiment, a propulsor can include a thrust element which may be integrated into the propulsor. The thrust element may include, without limitation, a device using moving or rotating foils, such as one or more rotors, an airscrew or propeller, a set of airscrews or propellers such as contra-rotating propellers, a moving or flapping wing, or the like. Further, a thrust element, for example, can include without limitation a marine propeller or screw, an impeller, a turbine, a pump-jet, a paddle or paddle-based device, or the like.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
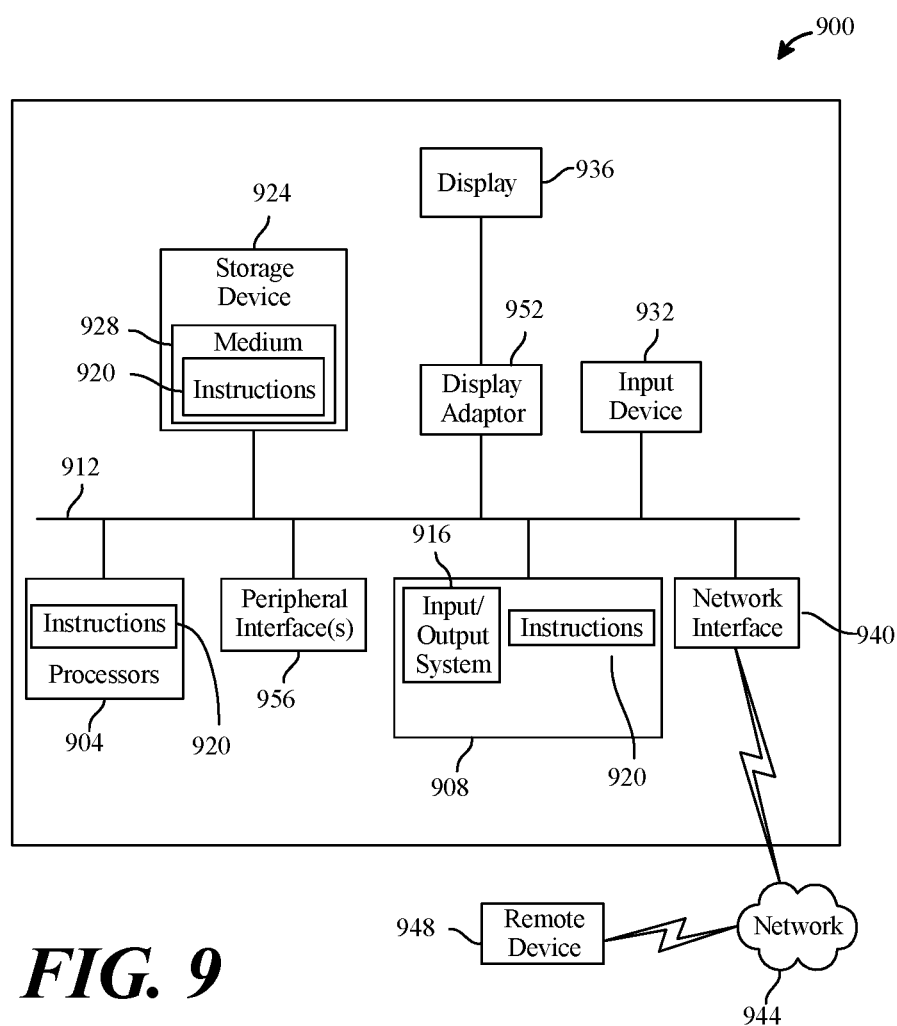
FIG. 9 is a block diagram of a computing system that can be used to implement any one or more of the methodologies disclosed herein and any one or more portions thereof.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for a laminated buswork with flexible conductors for an electric aircraft, the system comprising:
   a plurality of electrical devices;
   an electrical bridging device electrically connected to each electrical device of the plurality of devices, wherein the electrical bridging device comprises:
   a laminated busbar;
   a plurality of flexible contactors, wherein each flexible contactor is configured to:
      attach the at least a laminated busbar to each electrical device of the plurality of electrical devices;
      apply pressure to each electrical device as a function of at least a spring; and
      provide electrical connection to the electric aircraft as a function of the tension of the at least a spring.

2. The system of claim 1, wherein the electrical device further comprises a battery module.

3. The system of claim 1, wherein the electrical device further comprises a battery pack.

4. The system of claim 1, wherein the electrical bridging device further comprises a ring bus.

5. The system of claim 1, wherein the system electrical bridging device further comprises a circuit breaker of a plurality of circuit breakers, wherein each circuit comprises a flexible contactor.

6. The system of claim 1, wherein the system further comprises a contact mechanism, wherein the contact mechanism is configured to:
   hold the at least a spring in a fully compressed position; and
   release the at least a spring in a fully decompressed position.

7. The system of claim 6, wherein the contact mechanism is further configured to:
   join the electrical device and the laminated busbar as a function of the flexible contactor; and
   fully compress the at least a spring.

8. The system of claim 6, wherein the contact mechanism is further configured to:
   separate the electrical device from the laminated busbar as a function of the flexible contactor; and
   fully extend the at least a spring.

9. The system claim 1, wherein the at least a spring is held in position as a function of a spring connection system.

10. The system of claim 1, wherein the laminated bus bar further comprises at least a composite sheet comprising of conductive materials.

11. A method for a laminated buswork with flexible conductors for an electric aircraft, the method comprising:
   attaching a laminated busbar of an electrical bridging device to each electrical device of a plurality of electrical devices as a function of a plurality of flexible contactors;
   applying pressure to each electrical device as a function of at least a spring; and
   providing electrical connection to the electric aircraft as a function of the tension of the at least a spring.

12. The method of claim 11, wherein the electrical device further comprises a battery module.

13. The method of claim 11, wherein the electrical device further comprises a battery pack.

14. The method of claim 11, wherein the electrical bridging device further comprises a ring bus.

15. The method of claim 11, wherein the method electrical bridging device further comprises a circuit breaker of a plurality of circuit breakers, wherein each circuit comprises a flexible contactor.

16. The method of claim 11, wherein the method further comprises a contact mechanism, wherein the contact mechanism comprises:
   holding the at least a spring in a fully compressed position; and
   releasing the at least a spring in a fully decompressed position.

17. The method of claim 16, wherein the contact mechanism further comprises:
   joining the electrical device and the laminated busbar as a function of flexible contactor; and
   fully compressing the at least a spring.

18. The method of claim 16, wherein the contact mechanism further comprises:
   separating the electrical device from the laminated busbar as a function of the flexible contactor; and
   fully extending the at least a spring.

19. The method claim 11, wherein the at least a spring is held in position as a function of a spring connection system.

20. The method of claim 11, wherein the laminated bus bar further comprises at least a composite sheet comprising of conductive materials.

* * * * *